US012516812B2

(12) United States Patent
Lochschmied et al.

(10) Patent No.: US 12,516,812 B2
(45) Date of Patent: Jan. 6, 2026

(54) CONTROL AND/OR REGULATION OF A COMBUSTION APPARATUS

(71) Applicant: Siemens Aktiengesellschaft, Munich (DE)

(72) Inventors: Rainer Lochschmied, Rheinstetten-Forchheim (DE); Bernd Schmiederer, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 454 days.

(21) Appl. No.: 18/064,329

(22) Filed: Dec. 12, 2022

(65) Prior Publication Data
US 2023/0184434 A1 Jun. 15, 2023

(30) Foreign Application Priority Data

Dec. 13, 2021 (EP) .................................. 21214092
Jul. 19, 2022 (EP) .................................. 22185698

(51) Int. Cl.
F23N 1/02 (2006.01)
(52) U.S. Cl.
CPC .......... *F23N 1/022* (2013.01); *F23N 2223/04* (2020.01); *F23N 2223/36* (2020.01); *F23N 2235/18* (2020.01)
(58) Field of Classification Search
CPC ............. F23N 2223/04; F23N 2223/14; F23N 2223/36; F23N 2223/10; F23N 2223/44; F23N 2223/34; F23N 2235/18; F23N 1/022; F23N 5/006
USPC ................................................ 431/12, 18–90
See application file for complete search history.

(56) References Cited

U.S. PATENT DOCUMENTS

| 2005/0048425 | A1 | 3/2005 | Meier | ...................... F23M 3/04 |
| 2006/0246386 | A1* | 11/2006 | Webb | ........................ F23N 1/00 |
| | | | | 431/12 |
| 2010/0108046 | A1 | 5/2010 | Nakagawa et al. | ............ 123/674 |
| 2018/0094809 | A1 | 4/2018 | Lochschmied | ............ F23N 1/02 |

(Continued)

FOREIGN PATENT DOCUMENTS

| CN | 101657626 A | 2/2010 | ............. F02D 41/14 |
| DE | 10 2004 048 986 | 5/2005 | ............... F23N 1/02 |
| EP | 0 644 376 | 10/1997 | ............... F23N 5/00 |

(Continued)

*Primary Examiner* — Vivek K Shirsat
(74) *Attorney, Agent, or Firm* — Slayden Grubert Beard PLLC

(57) ABSTRACT

A facility for control of a combustion apparatus comprising: a memory storing a limit value and a correction factor; a communication connection to a sensor and an actuator; and a processor. The processor: receives an input signal from the sensor; uses the signal to form a measured value specifying a fuel air ratio, an air ratio, and/or an oxygen content; and loads the limit value and compares the measured value with the limit value. If the measured value is less than or greater than the limit value, the processor either loads the correction factor and determines a correction value as a function of the limit value, the correction factor, and the measured value, or loads the stored correction value from the memory, and then creates an output signal as a function of the correction value and sends the output signal to the actuator.

18 Claims, 4 Drawing Sheets

(56) References Cited

U.S. PATENT DOCUMENTS

2019/0203936 A1    7/2019    Hazzard ................... F23N 5/00

FOREIGN PATENT DOCUMENTS

| EP | 1 510 758 | 3/2005 | ............... | F23N 5/00 |
| EP | 3 073 195 | 9/2016 | ............... | F23N 1/02 |
| EP | 3 301 362 | 3/2020 | ............... | F23N 1/02 |

* cited by examiner

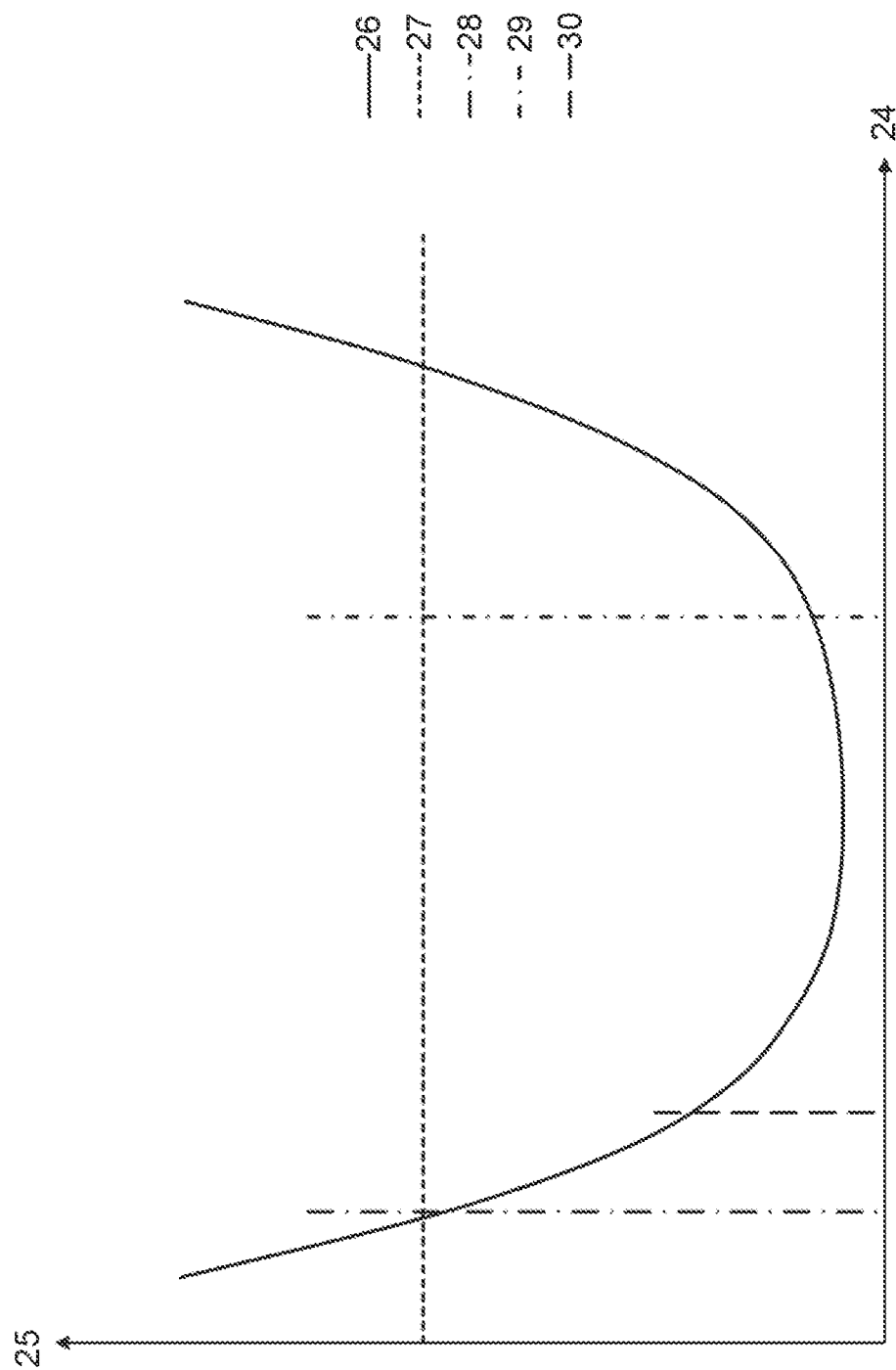

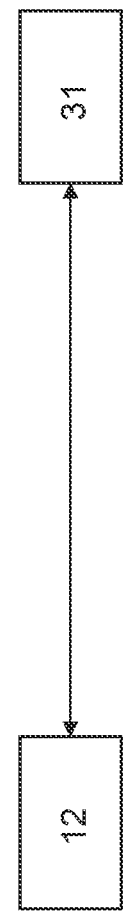

CONTROL AND/OR REGULATION OF A COMBUSTION APPARATUS

CROSS-REFERENCE TO RELATED APPLICATIONS

This application claims priority to EP Application No. 22185698.2 filed Jul. 19, 2022 and EP Application No. 21214092.5 filed Dec. 13, 2021, the contents of which are hereby incorporated by reference in their entirety.

TECHNICAL FIELD

The present disclosure relates to sensors, controls, and/or regulations. Various embodiments of the teachings herein may include combustion apparatuses, for example in gas burners.

BACKGROUND

Combustion sensors in combustion apparatuses are for example ionization electrodes and/or oxygen sensors and/or temperature sensors. Some systems account for the correction of such controls and/or regulations, taking into account the delayed response of the combustion sensor. In combustion apparatuses the fuel air ratio and/or the air ratio A can be established during combustion with the aid of a combustion sensor. In particular the fuel air ratio and/or the air ratio A can be established with the aid of an ionization current through the ionization electrode. In this case an AC voltage is first applied to the combustion sensor, in particular to the ionization electrode. With the aid of the rectifier effect of a flame an ionization current flows as direct current in only one direction.

With a control and/or regulation of a combustion sensor in the exhaust gas channel such as for example an oxygen sensor, the sensor signal reacts with a delay depending on the positioning of the combustion sensor in the exhaust gas channel. Furthermore the boiler size of the combustion apparatus, the current degree of modulation and the combustion sensor itself influence the reaction of the combustion sensor to the combustion process. Inter alia, because of the said influencing variables, the signal of a combustion sensor reacts with a dead time or delay time to the combustion process in a combustion apparatus.

Each dead time and/or delay time can amount to several tens of seconds. In some cases each dead time and/or delay time can even amount to more than one minute. The signal of the combustion sensor thus indicates what has been burned as part of the combustion process more than a few multiples of ten seconds or even more than a minute ago.

In the interim it is possible for the combustion process to have changed, for example because of external influences within each dead time and/or delay time. Further, at the time at which a signal is returned by the combustion sensor, the combustion process can have changed further than the signal of the combustion sensor is specifying. In particular the combustion process can have changed in such a way that a normal intervention of a control and/or regulation is too slow. As a result of the intervention of the control and/or regulation being too slow, it is then possible that critical combustion conditions can then no longer be changed. The possibility further exists that the change in the combustion process has progressed so far that the signal of the combustion sensor goes into a saturation. The signal of the combustion sensor in this case is then no longer a meaningful indication of the combustion process.

What is more the possibility exists that the ratio of the combustion products has changed so much that the flame blows off. The consequences of this are a short-term outflow of unburned fuel and/or an interruption of the heat generation and/or the need to restart the combustion apparatus. Thus the danger exists of ever more unfavorable combustion conditions and/or of an ever more unfavorable combustion process. The control and/or regulation, as a consequence of the dead time and/or delay time of the combustion apparatus and/or the system runtime of the control and/or regulation, cannot react sufficiently quickly. In particular the control and/or regulation cannot react sufficiently quickly to such unfavorable combustion conditions and/or to such an unfavorable combustion process.

Corresponding changes in the combustion process can be caused for example by a change in the supply of fuel, in particular gas. Further, a sudden inflow of air at a different temperature can rapidly change the combustion process. That change occurs more quickly than a control and/or regulation can intervene into the combustion process while taking account of its system runtime and/or the dead time and/or delay time of the combustion apparatus. Moreover modulation curves of air or fuel factors not set appropriately can lead to rapid changes in the combustion process. In particular such modulation curves can be problematic during the transition from a high power of the combustion apparatus to a low power of the same.

A European patent application EP1510758A1 contains a method for regulation or control of a burner. EP1510758A1 discloses a sensor, which detects oxygen in the exhaust gas of a combustion apparatus. A control and/or regulation establishes a regulation deviation from the actual value detected by the sensor and a corresponding setpoint value. The regulation deviation is converted into a control variable independent of the power of the combustion apparatus. On the basis of the power-independent control variables and based on parameters of the combustion apparatus for their operating points, a power-dependent control variable is moreover established. That power-dependent control variable is subsequently converted into a control signal for influencing the fuel air ratio $\lambda$.

A further European patent EP0644376B1 discloses an oxygen probe, with the aid of which residual oxygen content in exhaust gas of a combustion apparatus is measured. From the actual value of the residual oxygen content and a power-dependent setpoint value of the residual oxygen content a regulator establishes a regulation deviation. In this case a proportional, integral and derivative regulator is used, of which the proportional, integral and derivative components are independent of power. That proportional, integral and derivative regulator first establishes a power-dependent control variable. Finally a power-dependent control variable is established from the power-independent control variable through multiplication by a power-dependent distance amplification.

The European patent EP3301362B1 discloses a table, which plots a supply or air through an air supply channel against a first valve setting, a second valve setting and a throughflow through a side channel of the air supply channel. If an air supply is to be set that lies between two table values, a first valve setting is moved to that lies between the table values for the corresponding valve settings. In particular a setpoint value corresponding to a distance of x % between two table values of the air supply can be mapped to a distance of x % between the corresponding table values of the valve setting.

A patent application US2019/203936A1 deals with closed-loop control of a combustion appliance.

A European patent application EP3073195A1 deals with a method for calibrating a gas burner.

A patent application DE102004048986A1 deals with a method for regulation of a gas burner, in particular in heating installations with fans.

Previous solutions consist of an installer having to be convinced on site that modulation curves set are suitable for the combustion apparatus. The installer on site chooses the parameters of a control and/or regulation. In this case a compromise is to be made between a rapid control and/or regulation on the one hand and the avoidance of a tendency to fluctuate on the other hand. Furthermore an overreaction of the control and/or regulation is to be avoided.

A positioning of a combustion sensor as close as possible to the hot area also seems possible. That approach comes up against its limits, depending on the design of a combustion apparatus. Moreover it is possible that such a positioning reduces the life of the sensor. Likewise it is to be feared that the accuracy of the sensor deteriorates as a result of it being positioned as close as possible to the hot area.

SUMMARY

The present disclosure describes reaction of a control and/or regulation to a rapid change in a combustion process and a return to normal regulation mode. For example, some embodiments of the teachings herein include a facility (12) for control and/or regulation of a combustion apparatus (1), the control and/or regulation facility (12) comprising a memory in which at least one limit value and at least one factor and/or a correction value are stored, wherein the facility (12) is configured to be connected for communication to at least one first sensor (18) and to at least one first actuator (3, 4, 9) and is configured: to receive a first input signal from the at least one first sensor (18); to process the first input signal to form a first measured value, which specifies a fuel air ratio and/or an air ratio A and/or an oxygen content; to load the at least one limit value from the memory and to compare the first measured value with the at least one limit value; if the first measured value is less than the at least one limit value or is greater than the at least one limit value: either to load the at least one factor from the memory and to determine a correction value computationally as a function of the at least one limit value and as a function of the at least one factor and as a function of the first measured value or to load the stored correction value from the memory; and to create a first output signal as a function of the determined or stored correction value and to send the first output signal to the at least one first actuator (3, 4, 9).

In some embodiments, the facility (12) is embodied to create the first output signal as an exclusive function of the determined or stored correction value and/or as a function of current output signals.

In some embodiments, the first output signal is a first regulation signal and the facility (12) is embodied to determine the first regulation signal as a function of the determined or stored correction value and as a function of at least one variable selected from: the first input signal, the first measured value; and to send the first regulation signal to the at least one first actuator (3, 4, 9).

In some embodiments, the at least one factor is greater than one and the at least one limit value is at least a lower limit value and the facility (12) is embodied, if the first measured value is less than the at least one lower limit value, to determine the correction value computationally through augmentation of the first measured value or through augmentation of the at least one lower limit value in accordance with the at least one factor.

In some embodiments, the at least one factor is greater than one and the at least one limit value is at least an upper limit value and the facility (12) is embodied, if the first measured value is greater than the at least one upper limit value, to determine the correction value computationally by division of the first measured value or of the at least one upper limit value by the at least one factor.

In some embodiments, the at least one factor is greater than zero and the at least one limit value is at least a lower limit value and the facility (12) is embodied, if the first measured value is less than the at least one lower limit value, to determine the correction value computationally by increasing the first measured value or by increasing the at least one lower limit value by the at least one factor.

In some embodiments, the at least one factor is greater than zero and the at least one limit value is at least an upper limit value and the facility (12) is embodied, if the first measured value is greater than the at least one upper limit value, to determine the correction value computationally by reduction of the first measured value or by reduction of the at least one upper limit value by the at least one factor.

In some embodiments, an assignment of correction values and/or current output signals to first output signals is additionally stored in the memory, wherein the facility (12) is additionally able to be connected for communication to at least one second sensor (20, 22) and to at least one second actuator (4, 3, 9), wherein the at least one first sensor (18) is different from the at least one second sensor (20, 22), wherein the facility (12) is embodied: to load the assignment from the memory; using the assignment, to create the first output signal as an exclusive function of the determined or stored correction value and/or of the current output signals and to send it to the at least one first actuator (3, 4, 9); to receive a second input signal from the at least one second sensor (20, 22), wherein the second input signal specifies a flow rate; to process the second input signal to form a second measured value; to determine a second regulation signal as a function of the determined or stored correction value and as a function of at least one variable selected from: the second input signal, the second measured value; and to send the second regulation signal to the at least one second actuator (4, 3, 9).

In some embodiments, an assignment of correction values and/or current output signals to first output signals is additionally stored in the memory, wherein the facility (12) is additionally able to be connected for communication to at least one second sensor (20, 22) and to at least one second actuator (4, 3, 9), wherein the at least one first sensor (18) is different from the at least one second sensor (20, 22), wherein the facility (12) is embodied: to load the assignment from the memory; by using the assignment, to create the first output signal as an exclusive function of the determined or stored correction value and/or of the current output signals and to send it to the at least one first actuator (3, 4, 9); to create a first setpoint value, which specifies a flow rate, from the correction value and at least one variable selected from the first output signal, the first input signal, the first measured value; to receive a second input signal from the at least one second sensor (20, 22), wherein the second input signal specifies a flow rate; to process the second input signal to form a second measured value; to determine a third regulation signal as a function of the first setpoint value and as a function at least one variable selected from: the second input signal, the second measured value; and to send the third regulation signal to the at least one second actuator (4, 3, 9).

In some embodiments, a first index for a first fuel and a second index for a second fuel are stored in the memory of the facility (12) and the facility (12) is embodied: to determine the at least one factor computationally as a function of the first index and as a function of the second index; and to store the at least one factor in the memory of the facility (12).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio A and/or an oxygen content; to compare the third measured value with the at least one lower limit value; if the third measured value is greater than the at least one lower limit value: on the basis of the third measured value and/or on the basis of a dead time and/or delay time of the combustion apparatus (1), to create an output value, which is different from the determined or stored correction value; and to create a second output signal as a function of the output value and to send the second output signal to the at least one first actuator (3, 4, 9).

In some embodiments, the facility (12) is embodied: after the sending of the first output signal to the at least one first actuator (3, 4, 9), to receive a fourth input signal from the at least one first sensor (18); to process the fourth input signal to form a fourth measured value, which specifies a fuel air ratio and/or an air ratio A and/or an oxygen content; to add to the fourth measured value a change to be expected of an input signal of the at least one first sensors (18) because of previous output signals, while taking into account a dead time and/or delay time of the combustion apparatus (1); to create a second setpoint regulation value, which specifies a fuel air ratio and/or an air ratio A and/or an oxygen content, as a function of the determined or stored correction value and as a function of the dead time and/or delay time; and to regulate the combustion apparatus (1) based on the second setpoint regulation value.

In some embodiments, the facility (12) is connected for communication to at least one or to at least the one second sensor (20, 22) and is configured: after the sending of the first output signal to the at least one first actuator (3, 4, 9), to receive a fifth input signal from the at least one second sensor (20, 22), wherein the fifth input signal specifies a flow rate; to process the fifth input signal to form a fifth measured value; to receive a sixth input signal or a multitude of sixth input signals from the at least one first sensor (18); to create a third setpoint regulation value, which specifies a fuel air ratio and/or an air ratio A and/or an oxygen content, as a function of the fifth measured value and as a function of the sixth input signal or of the multitude of sixth input signals and/or as a function of a dead time and/or delay time of the combustion apparatus (1); and to regulate the combustion apparatus (1) based on the third setpoint regulation value.

In some embodiments, the facility (12) is connected for communication to at least one safety shutoff valve (7, 8), wherein the facility (12) is configured: after the sending of the first output signal to the at least one first actuator (3, 4, 9) and after a dead time and/or delay time of the combustion apparatus (1) has elapsed, to receive a seventh input signal from the at least one first sensor (18); to process the seventh input signal to form a seventh measured value, which specifies a fuel air ratio and/or an air ratio A and/or an oxygen content; to compare the seventh measured value with the at least one lower or the at least one upper limit value; if the seventh measured value is less than the at least one lower limit value or is greater than the at least one upper limit value: to create a closure signal; and to send the closure signal to the at least one safety shutoff valve (7, 8).

As another example, some embodiments include a combustion apparatus (1) comprising at least one combustion chamber (2), at least one first actuator (3, 4, 9), which acts on a fuel supply or an air supply to at least one combustion chamber (2), and at least one first sensor (18), and a facility (12) as describe herein, wherein the facility (12) is connected for communication to the at least one first actuator (3, 4, 9); and wherein the facility (12) is connected for communication to the at least one first sensor (18).

BRIEF DESCRIPTION OF THE DRAWINGS

Various features will become evident to the person skilled in the art from the following more detailed description of the disclosed non-restrictive forms of embodiment given below. The drawings, which accompany the more detailed description, can be described briefly as follows:

FIG. 3 illustrates a relationship between a fuel air ratio and the emissions of a combustion apparatus incorporating teachings of the present disclosure; and FIG. 4 shows a control and/or regulation in communication with a further computer incorporating teachings of the present disclosure.

DETAILED DESCRIPTION

Figure 1:
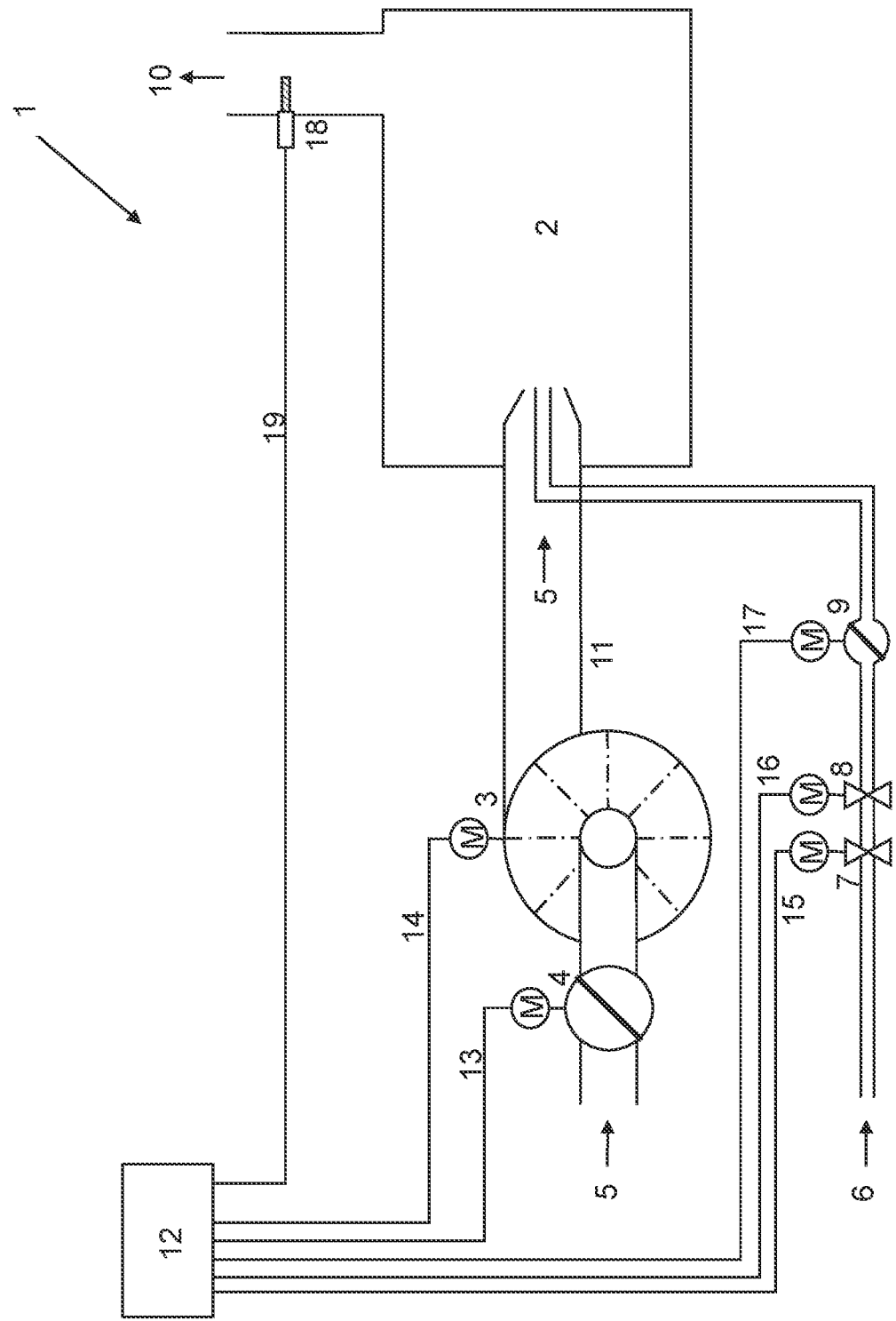
FIG. 1 shows a combustion apparatus with a combustion sensor in the form of an exhaust gas sensor incorporating teachings of the present disclosure.

First of all the control and/or regulation accepts a signal of a sensor, for example of a combustion sensor. From this signal a measured value is created. In this case an analog-digital converter and/or a Delta-Sigma unit can be employed. The measured value is compared with an upper and/or lower limit value. If the upper limit value is exceeded or the lower limit value is not reached, the control and/or regulation reacts.

The control and/or regulation can react on the one hand by a new setpoint value being calculated from the measured value from the signal of a sensor and/or from the limit value of the measured value. Subsequently the setpoint value is changed. Preferably a new setpoint value is calculated and changed for a measured value from the signal of a sensor in the combustion chamber or exhaust gas path and/or from the limit value of the measured value. The setpoint value can also be changed to a fixed stored value instead of a calculated value, set for the case in which the limit value is exceeded or is not reached, and thus changed. The control and/or regulation subsequently controls and/or regulates to the newly calculated or set and thus changed setpoint value. Thus an amplified or faster reaction of the control and/or regulation facility is achieved. The new setpoint value is chosen on the one hand so that, after the dead time and/or delay time of the combustion apparatus, has elapsed, the expired, the newly accepted measured value adheres to the upper and/or lower limit value. In other words critical emissions, in particular critical emissions of carbon monoxide, are avoided. At least the length of time for which they occur is greatly reduced. On the other hand the newly calculated setpoint value is chosen so that the combustion apparatus can be operated in a stable manner.

The control and/or regulation can on the other hand react by intervening directly into the actuators of the combustion apparatus. As a result of the direct intervention the throughflow amounts of the combustion products in relation to one another are changed by a predetermined measure. In other words, the fuel air ratio and/or the air ratio λ and/or the oxygen content is changed by a direct intervention. The new fuel air ratio and/or the new air ratio λ is one the one hand chosen so that, after the dead time and/or delay time of the combustion apparatus has elapsed, newly accepted measured values adhere to the limit value. The new oxygen content can be chosen so that, after the dead time and/or delay time of the combustion apparatus has elapsed, newly accepted measured values adhere to the limit value. In particular the upper and/or the lower limit value is adhered to. Thus critical emissions, in particular critical emissions of carbon monoxide, are avoided. At least the length of time for which they occur is greatly reduced. On the other hand the new fuel air ratio and/or the new air ratio λ and/or the new oxygen content are chosen so that the combustion apparatus can be operated in a stable mode.

In some embodiments, the control and/or regulation intervenes in the combustion process in such a way that the combustion apparatus does not oscillate. That means that the actuators of the air and fuel supply are not or are not essentially controlled and/or regulated in an oscillating manner. As a result the measured values accepted by a combustion sensor do not exhibit any or essentially do not exhibit any oscillating behavior.

In some embodiments, the control and/or regulation intervenes in the combustion process in such a way that the combustion apparatus works in a stable way. That means that the control signals for the actuators lie within the valid range of values. Moreover the combustion mixture is set and/or regulated so that the flame does not blow off. Furthermore the measurement signals recorded by a combustion sensor lie in the valid range of the input signals of the control and/or regulation.

After such an intervention, the return of the control and/or regulation into normal control and/or regulation mode occurs as a function of the behavior over time of the combustion apparatus. In the case of the changed setpoint value, this setpoint value is taken back to the original setpoint value depending on the behavior over time. In the case of a direct intervention into the actuators, the new ratio of the throughflow amounts of the combustion products to one another is initially retained unchanged. When the effect of the intervention has become visible in the signal of the combustion sensor, a return is made to the normal control and/or regulation mode. Thereafter the combustion process is adapted to the new ambient conditions.

Furthermore there is provision for an optimization of the control and/or regulation with the aid of a further computer. The further computer is arranged remotely from the control and/or regulation. The further computer is advantageously connected to a plurality of similar controllers and/or regulators. The further computer for example makes it possible via a statistical approach to optimize the controllers and/or regulators in operation.

FIG. 1 shows a combustion apparatus 1 such as for example a floor-standing gas burner and/or an oil burner. In the combustion chamber 2 of the combustion apparatus 1 a flame of a heat generator burns during operation. The heat generator puts the heat energy of the hot fuel gases into another fluid such as for example water. With the hot water a hot water heating installation is operated example and/or drinking water is heated up. In some embodiments, a good can be heated up for example in an industrial process with the heat energy of the hot combustion materials and/or fuel gases. In some embodiments, the heat generator is part of an installation for power heat coupling, for example a motor of such an installation. In some embodiments, the heat generator is a gas turbine. The heat generator can further serve to heat up water in an installation for obtaining lithium and/or lithium carbonate. The exhaust gases 10 are exhausted from the combustion chamber 2 via a chimney for example.

The air supply 5 for the combustion process is via a (motor-) driven fan 3. Via the signal line 14 a control and/or regulation facility 12 specifies the air supply $V_L$ to the fan 3, which is to convey it. Thus means that the fan speed is a measure for the air supply 5.

In some embodiments, the fan speed is reported to the control and/or regulation facility 12 by the fan 3. For example the control and/or regulation facility 12 controls the speed of the fan 3 via the signal line 14.

In some embodiments, the control and/or regulation facility 12 comprises a microcontroller. In some embodiments, the control and/or regulation facility 12 comprises a microprocessor. The control and/or regulation facility 12 can be a regulation facility. In some embodiments, the regulation facility comprises a microcontroller. In some embodiments, the regulation facility comprises a microprocessor. The regulation facility can comprise a proportional and integral regulator. The regulation facility can further comprise a proportional and integral and derivative regulator.

The control and/or regulation facility 12 can further comprise a field-programmable (logic) gate array. Furthermore the control and/or regulation facility 12 can comprise an application-specific integrated circuit.

In some embodiments, the signal line 14 comprises an optical waveguide. In some embodiments, the signal line 14 is embodied as an optical waveguide. Optical waveguides may provide advantages in respect of electrical isolation and protection against explosions.

If the air supply 5 is set via an air flap and/or a valve 4, the flap and/or valve setting can be used as a measure for the air supply 5.

In some embodiments, the air supply $V_L$ is the value of the current air throughflow rate. The air throughflow rate can be measured and/or specified in cubic meters of air per hour. The air supply $V_L$ can be measured and/or specified in cubic meters of air per hour.

In some embodiments, the fuel supply $V_B$ is set and/or regulated by the control and/or regulation facility 12 with the aid of a fuel actuator and/or a valve 9 which can be set (by a motor). In the embodiment in FIG. 1, the fuel 6 is fuel gas. A combustion apparatus 1 can then be connected to different sources of fuel gas, for example to sources with a high proportion of methane and/or to sources with a high proportion of propane. Likewise there is provision for the combustion apparatus 1 to be connected to a source of a gas or a gas mixture, wherein the gas or the gas mixture comprises hydrogen. In some embodiments, there is provision for the gas or the gas mixture to comprise more than five percent, in particular more than five percent by mass, of hydrogen. The amount of fuel gas can be set for example by a fuel valve 9, which can be set (by a motor), by the control and/or regulation facility 12. The control value, for example a pulse width-modulated signal, of the gas valve in this case is a measure for the amount of fuel gas. It is also a value for the fuel supply $V_B$.

If a gas valve is used as the fuel actuator 9, then the position of the valve can be used as a measure for the amount of fuel gas. In some embodiments, a fuel actuator 9 and/or fuel valve 9 is set with the aid of a stepping motor. In that case the step setting of the stepping motor is a measurement for the amount of fuel. The fuel valve and/or the fuel flap can also be integrated in a unit with at least one or more safety shutoff valves 7, 8. A signal line 17 connects the fuel actuator 9 to the control and/or regulation facility 12. In some embodiments, the signal line 17 comprises an optical waveguide. Optical waveguides may provide advantages in respect of electrical isolation and protection against explosions.

FIG. 1 likewise shows a combustion apparatus 1 with a combustion sensor 18 for detecting an air ratio λ. The combustion sensor 18 can for example comprise an oxygen sensor and/or an ionization electrode. The combustion sensor 18 can also be an oxygen sensor. In some embodiments, the combustion sensor 18 is arranged in the exhaust gas channel. The combustion sensor 18 can be an exhaust gas sensor. The combustion sensor 18 can comprise an exhaust gas sensor.

A signal line 19 connects the combustion sensor 18 to the control and/or regulation facility 12. In some embodiments, the signal line 19 comprises an optical waveguide. Optical waveguides may provide advantages in respect of electrical isolation and protection against explosions.

Figure 2:
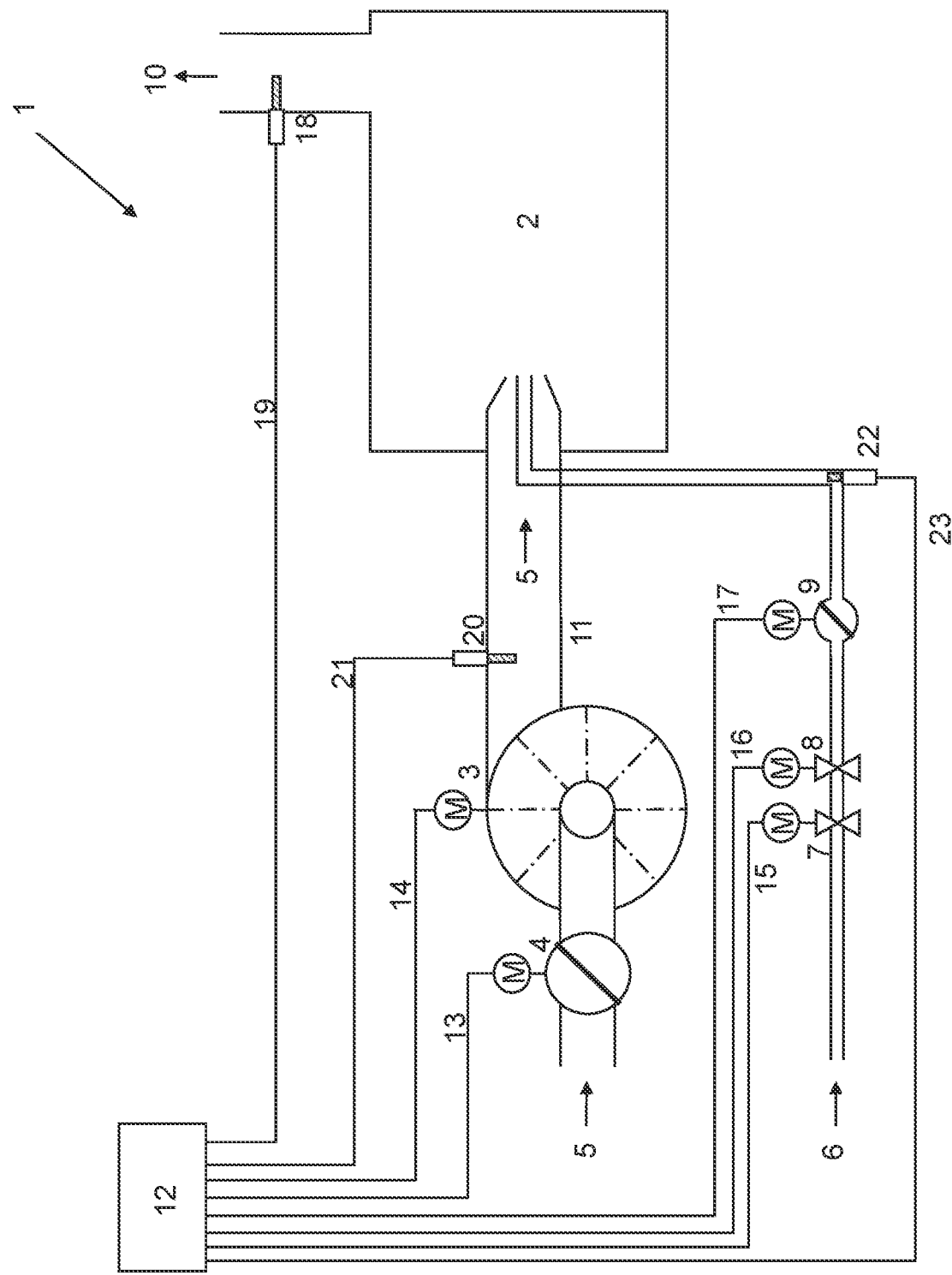
FIG. 2 shows a combustion apparatus with a combustion sensor in the form of an exhaust gas sensor and additionally with a sensor in or on the air channel and/or in or on the fuel channel incorporating teachings of the present disclosure.

FIG. 2, by comparison with FIG. 1, additionally shows a sensor 20 in the air supply channel 11. If the air supply 5 is set via an air flap and/or a valve, the flap and/or valve setting can be used as a measure for the air supply 5. Furthermore a measured value derived from the signal of a pressure sensor and/or mass flow sensor and/or volume flow sensor can be used. The sensor 20 may be arranged in the channel 11 for the air supply 5. In some embodiments, the sensor 20 provides a signal, which is converted with the aid of a suitable signal-processing unit into a measured flow value.

Mass flow sensors allow measurement at high flow speeds specifically in conjunction with combustion apparatuses during operation. Typical values of such flow speeds lie in the ranges of between 0.1 meters per second and 5 meters per second, 10 meters per second, 15 meters per second, 20 meters per second, or even 100 meters per second. Mass flow sensors that are suitable for use with the teachings of the present disclosure are for example OMRON® D6F-W or SENSOR TECHNICS® WBA type sensors. The usable range of these sensors typically starts at speeds between 0.01 meters per second and 0.1 meters per second and ends at a speed such as for example 5 meters per second, 10 meters per second, 15 meters per second, 20 meters per second, or even 100 meters per second. In other words limits lower than 0.1 meters per second combined with upper limits such as 5 meters per second, 10 meters per second, 15 meters per second, 20 meters per second, or even 100 meters per second.

In some embodiments, the signal of the sensor 20 is reported with the aid of a signal line 21. In particular with the aid of the signal line 21 a signal can be returned to the control and/or regulation facility 12, which is a measure for an air supply 5.

The signal line 21 can comprise an optical waveguide. Optical waveguides may provide advantages in respect of electrical isolation and protection against explosions. In some embodiments, the signal processing facility for processing the signal of the sensor 20 comprises at least one analog to digital converter. In some embodiments, the signal processing facility, in particular the analog to digital converter or converters, is integrated into the control and/or regulation facility 12. In some embodiments, the signal processing facility, particular the analog to digital converter or converters, is integrated into the sensor 20. The sensor signals are then transmitted to the control and/or regulation facility 12 via a communication interface with a predetermined communication bus protocol.

The measured value of a pressure sensor and/or of a mass flow sensor in a side channel of the air supply 5 can also be used as a measure for the air supply $V_L$. A combustion apparatus with supply channel and side channel is disclosed for example in European patent EP3301364B1. A combustion apparatus with supply channel and side channel is claimed, wherein a mass flow sensor projects into the supply channel.

A pressure sensor and/or a mass flow sensor in the side channel establishes a signal, which corresponds to the pressure value and/or the air flow (particle and/or mass flow) in the side channel dependent on the air supply $V_L$. In some embodiments, the sensor provides a signal, which is converted with the aid of a suitable signal processing facility into a measured value. In some embodiments, the signals of a number of sensors are converted into a common measured value. In some embodiments, the signal processing facility comprises at least one analog to digital converter. In some embodiments, the signal processing facility, in particular the analog to digital converter or converters, is or are integrated into the control and/or regulation facility 12. In some embodiments, the signal processing facility, in particular the analog to digital converter or converters, is or are integrated into the sensor or the sensors. The sensor signals are then transmitted to the control and/or regulation facility 12 via a communication interface with a predetermined communication bus protocol.

FIG. 2 further additionally shows, compared to FIG. 1, a sensor 22 in the fuel supply channel. A measured value derived from the signal of a pressure sensor and/or mass flow sensor and/or volume flow sensor is used as a measure for the amount of fuel. The mass flow sensor can also be embodied in this case as a thermal mass flow sensor. The volume flow sensor can be realized for example as a turbine blade meter and/or bellows meter and/or as a differential pressure sensor. The sensor 22 is advantageously arranged in the channel for the fuel supply. A signal line 23 connects the flow and/or pressure sensor 22 to the control and/or regulation facility 12.

Furthermore the fuel actuator 9 can be a valve regulated internally via a flow and/or pressure sensor. Such a fuel valve 9 receives a setpoint value and regulates the actual value of the flow and/or pressure sensor to the setpoint value. Moreover the fuel valve 9 can also be integrated into a unit with at least one or more safety shutoff valves 7, 8. The fuel valve 9 can further be embodied so that it takes over the function of one of the safety cutoff valves 7, 8 as well. The flow and/or pressure sensor can be realized in this case as a volume flow sensor for example as a turbine blade meter and/or as a bellows meter and/or as a differential pressure sensor. The flow and/or pressure sensor can also be embodied as a mass flow sensor, for example as a thermal mass flow sensor.

In some embodiments, the sensor 22 provides a signal, which is converted with the aid of a suitable signal-processing unit into a measured flow value (measured value of the particle and/or mass flow and/or volume flow).

In some embodiments, the signal of the sensor 22 is reported with the aid of a signal line 23. In particular a signal, which is a measure for a fuel supply 6, can be reported with the aid of the signal line 23 to the control and/or regulation facility 12. The signal line 23 can comprise an optical waveguide. Optical waveguides may provide advantages in respect of electrical isolation and protection against explosions. In some embodiments, the signal processing facility for processing the signal of the sensor 22 comprises at least one analog to digital converter. In some embodiments, the signal processing facility, in particular the analog to digital converter or converters, is or are integrated into the control and/or regulation facility 12. In some embodiments, the signal processing facility, in particular the analog to digital converter or converters, is or are integrated into the sensor 22. The sensor signals are then transmitted to the control and/or regulation facility 12 via a communication interface with a predetermined communication bus protocol.

In FIG. 3, by way of example, for a power such as for example the most critical power, the emissions 25 of a combustion apparatus 1 are plotted against the fuel air ratio and/or the air ratio $\lambda$ 4. Likewise in FIG. 3, by way of example, for a power such as for example the most critical power, the emissions 25 of a combustion apparatus 1 are plotted against the oxygen content. Emissions 25 of the combustion apparatus 1 are for example emissions in the form of carbon monoxide. A horizontal line 27 specifies a threshold value, as from which the emissions 25 of the combustion apparatus 1, in particular the emissions 25 of the combustion apparatus 1 in the form of carbon monoxide, are critical. In some embodiments, the emissions 25, in particular the emissions 25 of carbon monoxide, lie above a critical value as from the line 27. Such critical values can be set for example by standards and/or ordinances and/or laws.

The vertical lines in FIG. 3 each correspond to a fuel air ratio and/or an air ratio $\lambda$ and/or an oxygen content. The way in which the lines relate to one another can best be expressed via the combustion ratio and/or the air ratio $\lambda$. For the sake of simplification the terms fuel air ratio and/or air ratio $\lambda$ are therefore used predominantly in the description below.

In some embodiments, the oxygen content is an oxygen content in an exhaust gas channel of the combustion apparatus 1. In some embodiments, the oxygen content is an oxygen content in the exhaust gas 10, for example in the exhaust gas 10 of the combustion apparatus 1.

A first vertical line 28 in FIG. 3 specifies a fuel air ratio and/or an air ratio $\lambda$, below which the emissions 25 become critical in accordance with curve 26. In particular the vertical line 28 can specify a fuel air ratio and/or an air ratio $\lambda$, below which the emissions 25 of carbon monoxide are critical. Furthermore the vertical line 28 can specify a fuel air ratio and/or an air ratio $\lambda$, below which the emissions 25 exceed one of the aforementioned critical values. Furthermore the vertical line 28 can specify a fuel air ratio and/or an air ratio $\lambda$, below which the emissions 25 of carbon monoxide exceed one of those critical values.

A second vertical line 29 specifies a further fuel air ratio and/or a further air ratio $\lambda$. The further fuel air ratio and/or the further air ratio $\lambda$, compared to the fuel air ratio and/or the air ratio $\lambda$, corresponding to line 28, has been multiplied by a factor. That factor may be greater than 1 or greater than 1.02. That factor can also be greater than 1.05. A larger factor shifts the fuel air ratio and/or the air ratio $\lambda$ in accordance with line 28 markedly in the direction of the uncritical emissions in accordance with line 29. In particular a larger factor can shift the fuel air ratio and/or the air ratio $\lambda$ in accordance with line 28 markedly in the direction of the uncritical emissions of carbon monoxide in accordance with line 29. Furthermore a larger factor can shift the fuel air ratio and/or the air ratio $\lambda$ in accordance with line 28 markedly in the direction of the emissions below the critical value in accordance with line 27.

In some embodiments, that factor is less than or equal to 1.41. In this case a factor of 1.41 corresponds to a change in the Wobbe index during a change from a low-calorific fuel to a high-calorific fuel. In particular the factor of 1.41 corresponds to a change in the Wobbe index during a change from a low-calorific fuel gas to a high-calorific fuel gas. In some embodiments, changes from L gas to E gas are envisaged.

Thus the person skilled in the art recognizes that the multiplicative factor, with the aid of which the fuel air ratio and/or the air ratio $\lambda$ is changed, depends on the fuels in question. In some embodiments, the person skilled in the art recognizes that the multiplicative factor, with the aid of which the fuel air ratio and/or the air ratio $\lambda$ is changed, depends on the fuel gases in question. Thus the factor can be both less than and greater than the aforementioned value.

In general the setpoint regulation value for normal operation, which is illustrated in FIG. 3 as line 30, will have a positive distance from the limit in accordance with line 28. This means that the setpoint regulation value for a larger fuel air ratio and/or for a larger air ratio $\lambda$ lies as a lower limit value. Reactions to changes to be expected as a result of a single error source, in particular of the fuel, are thereby guided to a fuel air ratio and/or to an air ratio $\lambda$ around the setpoint regulation value in normal operation. Reactions to changes to be expected as a result of a single error source, in particular of the fuel, do not lead one-sidedly to a higher fuel air ratio and/or a higher air ratio $\lambda$.

Furthermore the person skilled in the art takes into account, for a jump in the setpoint value of the fuel air ratio and/or of the air ratio $\lambda$, the limits of the combustion apparatus 1. In particular the person skilled in the art chooses the multiplicative factor with the aid of which the fuel air ratio and/or the air ratio $\lambda$ is changed so that the combustion apparatus 1 continues to operate in a stable manner. In this case there is provision to change that multiplicative factor so that the control and/or regulation of the combustion apparatus 1 remains stable. The control and/or regulation of the combustion apparatus 1 should in particular not oscillate. In one specific form of embodiment the control and/or regulation can control and/or regulate the combustion apparatus 1 in a permanently stable manner with the aid of at least one actuator 3, 4, 9.

There is further provision for changing that multiplicative factor so that the control and/or regulation facility 12 of the combustion apparatus 1 remains stable. The control and/or regulation facility 12 of the combustion apparatus 1 should in particular not oscillate. Within that area the control and/or regulation device 12 can control and/or regulate the combustion apparatus 1 stably with the aid of at least one actuator 3, 4, 9. In one specific form of embodiment the control and/or regulation facility 12 can permanently control and/or regulate stably with the aid of at least one actuator 3, 4, 9.

Furthermore the multiplicative factor, with the aid of which the fuel air ratio and/or the air ratio $\lambda$ is changed, can be chosen so that no flame blow-off is provoked in the combustion apparatus 1. In particular the multiplicative factor is chosen so that no flame blow-off is provoked in the combustion chamber 2 of the combustion apparatus 1. What is more the multiplicative factor can be chosen so that no flame blow-off is provoked in the combustion chamber 2 of the combustion apparatus 1.

In some embodiments, the multiplicative factor, with the aid of which the fuel air ratio and/or the air ratio λ is changed, is chosen so that no flame blow-off occurs in the combustion apparatus 1. In particular the multiplicative factor is chosen so that no flame blow-off occurs in the combustion chamber 2 of the combustion apparatus 1. What is more the multiplicative factor can be chosen so that no flame blow-off occurs at the combustion chamber 2 of the combustion apparatus 1.

In the case of a rapid change, for example as a result of switching a fuel gas, the control and/or regulation facility 12 reacts in accordance with the present disclosure. Such a rapid change can be caused inter alia by a switch to a high-calorific fuel gas. The control and/or regulation facility 12 accordingly receives a signal, for example a signal of a combustion sensor 18. It processes that signal to form a first measured value of the fuel air ratio and/or the air ratio λ and/or the oxygen content. The control and/or regulation facility 12 subsequently checks by a comparison whether the fuel air ratio and/or the air ratio λ and/or of the oxygen content lies below the limit in accordance with line 28. If such is the case, the setpoint value of the fuel air ratio and/or of the air ratio λ or the limit value in accordance with line 28 is multiplied by one of the aforementioned factors. The measured value of the fuel air ratio and/or of the air ratio λ can also be multiplied by one of the aforementioned factors.

If the multiplicative factor is applied to the setpoint regulation value in normal operation, the ratio of limit value to setpoint regulation value in normal operation can be included in the calculation. That means that the multiplicative factor is reduced. Subsequently the control and/or regulation facility 12 regulates the combustion apparatus to the setpoint value of the fuel air ratio and/or of the air ratio λ obtained by multiplication. The control and/or regulation facility 12 can for example regulate to the setpoint value of the fuel air ratio and/or of the air ratio λ obtained by multiplication with the aid of at least one actuator 3, 4, 9.

In some embodiments, the control and/or regulation facility 12 likewise checks whether the fuel air ratio and/or the air ratio λ lies below the limit in accordance with line 28. For this the control and/or regulation facility 12 may carry out a comparison of the measured fuel air ratio and/or the measured air ratio λ with the limit in accordance with line 28. If such is the case, a summand is added to the setpoint value of the fuel air ratio and/or of the air ratio λ and/or to the limit value in accordance with line 28.

That summand may be greater than 0, or greater than 0.02. That summand can also be greater than 0.05. A larger summand shifts the fuel air ratio and/or the air ratio λ in accordance with line 28 markedly in the direction of the uncritical emissions in accordance with line 29. In particular a larger summand can shift the fuel air ratio and/or the air ratio λ in accordance with line 28 markedly in the direction of the uncritical emissions of carbon monoxide in accordance with line 29. A larger summand can further shift the fuel air ratio and/or the air ratio λ in accordance with line 28 markedly in the direction of the emissions below the critical value in accordance with line 27.

Following on from the addition, the control and/or regulation facility 12 regulates the combustion apparatus to the setpoint value of the fuel air ratio and/or of the air ratio λ obtained by the addition. The control and/or regulation facility 12 can regulate to the setpoint value of the fuel air ratio and/or of the air ratio λ obtained by the addition, for example with the aid of at least one actuator 3, 4, 9.

In some embodiments, the control and/or regulation facility 12 likewise checks whether the fuel air ratio and/or the air ratio λ lies below the limit in accordance with line 28. If such is the case, the setpoint value is set to a fixed value stored for this case. Subsequently the control and/or regulation facility 12 regulates the combustion apparatus 1 to the set setpoint value of the fuel air ratio and/or of the air ratio λ. The control and/or regulation facility 12 can regulate to the set setpoint value of the fuel air ratio and/or of the air ratio λ, for example with the aid of at least one actuator 3, 4, 9.

As a result of the control and/or regulation to the computationally obtained or set setpoint value a distinction is to be made between a number of cases. First of all it can occur that the rapid change is of a temporary nature. In particular the rapid change can involve a fault. In the case of a fault no change takes place to the fuel and/or the fuel mixture and/or the fuel composition and/or other ambient conditions. In such a case emissions 25 are produced as a result of the control and/or regulation to the computationally obtained setpoint value corresponding to the intersection point of curve 26 and line 29. The emissions 25 are below the critical emissions in accordance with line 27. In particular the emissions 25 can lie below the critical value designated by line 27. The emissions 25 of carbon monoxide can further be below the critical emissions in accordance with line 27. Furthermore the emissions 25 of carbon monoxide can lie below the critical value designated by line 27.

It can further occur that the rapid change lasts. For example there can be a lasting switch from a low-calorific fuel gas to a high-calorific fuel gas. A lasting switch from low-calorific fuel gas to high-calorific fuel gas can lie within the area covered by the factor. In these cases, as a result of the control and/or regulation, the emissions 25 lie at the intersection point of curve 26 and line 28. The emissions 25 are at or below the critical emissions in accordance with line 27. In particular the emissions 25 can lie at or below the critical value designated by line 27. The emissions 25 of carbon monoxide can further be at or below the critical emissions in accordance with line 27. Furthermore the emissions 25 of carbon monoxide can lie at or below the critical value designated by line 27.

Furthermore a rapid switch from a low-calorific fuel gas to a fuel gas in the mid range can occur. This change leads as a result of the control and/or regulation to a state of which the emissions 25 correspond to a fuel air ratio and/or to an air ratio λ between the lines 28 and 29. The emissions 25 are once again below the critical emissions in accordance with line 27. In particular the emissions 25 can lie below the critical value designated by line 27. The emissions 25 of carbon monoxide can further be below the critical emissions in accordance with line 27. Furthermore the emissions 25 of carbon monoxide can lie below the critical value designated by line 27.

In some embodiments, the control and/or regulation facility 12 reacts to a rapid change by a direct intervention into at least one first actuator 3, 4, 9. In this case the setpoint regulation value remains unchanged. Such a rapid change can be brought about inter alia as a reaction to a switch to a high-calorific fuel gas. The control and/or regulation facility 12 accordingly receives a signal, for example a signal of a combustion sensor 18. It processes that signal to form a first measured value of the fuel air ratio and/or of the air ratio λ. The control and/or regulation facility 12 subsequently checks by a comparison whether the fuel air ratio and/or the air ratio λ lies below the limit in accordance with line 28. If such is the case, a signal to at least one of the actuators 3, 4, 9 is generated. In the case of an air actuator 3, 4 that signal includes an increasing the air supply by a factor. In the case of a fuel actuator 9 that signal includes reducing the fuel supply, in particular the supply of fuel gas, by this factor. The signal is sent to the at least one actuator 3, 4, 9. The actuator 3, 4, 9 receives the signal. In the case of an air actuator 3, 4 the air actuator 3, 4, as a response to the signal, increases the air supply by that factor. In the case of a fuel actuator 9, the fuel actuator 9, as a response to the signal, reduces the fuel supply by that factor.

A signal can further be sent to more than one actuator 3, 4, 9 in each case. Thus a first signal to at least one air actuator 3, 4 is generated. In addition a second signal to at least one fuel actuator 9 is generated. The first signal includes an increase in the air supply. The second signal includes a reduction in the fuel supply, in particular the fuel gas supply. The combined effect of increasing the air supply in accordance with the first signal and reducing the fuel supply, in particular of the fuel gas supply, brings about an increase in the fuel air ratio and/or in the air ratio $\lambda$. The fuel air ratio and/or the air ratio $\lambda$ is increased by that aforementioned factor.

What is more a signal can be sent to more than one air actuator 3, 4 in each case. Thus a third signal to at least one first air actuator 3, 4 is generated. In addition a fourth signal to at least one second air actuator 4, 3 is generated. The third signal includes an increase in the air supply by the first air actuator 3, 4. The fourth signal likewise includes an increase in the air supply by the second air actuator 4, 3. The combined effect of increasing the air supply in accordance with the third signal and increasing the air supply in accordance with the fourth signal brings about an increase in the fuel air ratio by that aforementioned factor. The combined effect of increasing the air supply in accordance with the third signal and increasing the air supply in accordance with the fourth signal can also bring about an increase in the air ratio $\lambda$ by that aforementioned factor.

In some embodiments, a mixed controlled and regulated operation is possible. The control and/or regulation facility 12 initially generates a setpoint value for an air supply by the air supply channel 11 on the basis of that aforementioned factor. The control and/or regulation facility 12 subsequently creates a setpoint value signal for an air supply by the air supply channel 11 on the basis of the setpoint value for the air supply by the air supply channel 11. On the basis of the setpoint value signal for the air supply a fifth signal to at least one first air actuator 3, 4 is generated. Optionally the fifth signal can also be generated on the basis of the setpoint value for the air supply by the air supply channel 11. The control and/or regulation facility 12 sends the fifth signal to the at least one first air actuator 3, 4.

The first air actuator 3, 4 receives the fifth signal. The first air actuator 3, 4 sets an air supply in accordance with the fifth signal, is thus controlled. Furthermore the control and/or regulation facility 12 receives a signal from a sensor 20 in the air supply channel 11. The control and/or regulation facility 12 generates a first regulation signal from the signal from the sensor 20 in the air supply channel 11 and the setpoint value signal for the air supply. Optionally the control and/or regulation facility 12 can also generate a first regulation signal from the signal from the sensor 20 in the air supply channel 11 and the setpoint value for the air supply.

The control and/or regulation facility 12 sends the first regulation signal to at least one second air actuator 4, 3. The control and/or regulation facility 12 regulates with the aid of the second air actuator 4, 3 the air supply by the air supply channel 11 to the setpoint value signal for the air supply by the air supply channel 11. Preferably the at least one first air actuator 3, 4 and the at least one second air actuator 4, 3 are arranged in series. The combination of control of the first air actuator 3, 4 and regulation of the second air actuator 4, 3 brings about an increase in the fuel air ratio and/or the air ratio $\lambda$ by that aforementioned factor.

In some embodiments, a mixed controlled and regulated operation including at least one fuel actuator 9 and at least one air actuator 3, 4 is possible. The control and/or regulation facility 12 initially generates a setpoint value on the basis of that aforementioned factor. Subsequently the control and/or regulation facility 12 creates a sixth signal on the basis of the generated setpoint value. The control and/or regulation facility 12 sends the sixth signal to the at least one fuel actuator 9.

The at least one fuel actuator 9 receives the sixth signal. The at least one fuel actuator 9 sets a fuel supply, in particular a fuel gas supply, in accordance with the sixth signal, is thus controlled. Furthermore the control and/or regulation facility 12 receives a signal from a sensor 20 in the air supply channel 11. The control and/or regulation facility 12 creates a second regulation signal from the signal from sensor 20 in the air supply channel 11 and the generated setpoint value.

The control and/or regulation facility 12 sends the second regulation signal to the at least one air actuator 3, 4. The control and/or regulation facility 12 regulates the air supply by the air supply channel 11 with the aid of the at least one air actuator 3, 4. The combination of control of the fuel actuator 9 and regulation of the air actuator 3, 4 brings about an increase in the fuel air ratio and/or in the air ratio $\lambda$ by that aforementioned factor.

The following mixed controlled and regulated operating modes are further possible:
- Control of the at least one air actuator 3, 4 and regulation of the at least one fuel actuator 9; the regulation signal is created from the signal from sensor 22 and the generated setpoint value.
- Control of at least one actuator 3, 4, 9 and subsequently the regulation and/or fine regulation of the at least one actuator 3, 4, 9. In this case the regulation signal is created from the signal from sensor 20 and/or 22 and the generated setpoint value.

As a result of the violation of a limit value the control and/or the regulation changes the activation signals of the actuators more sharply and/or more markedly than as a result of the regulation in normal operation. In general, as a result of the violation of a limit value, the control and/or the regulation changes the signals to the actuators more sharply and/or more markedly than as a result of regulation in normal operation. Thus the fuel air ratio and/or the air ratio $\lambda$ is immediately guided by the change into the area between the lines 28 and 29. This applies for changes within the area covered by the factor. In the measurement signal of the combustion sensor 18 this will however become fully evident after the dead time and delay time of the combustion apparatus 1 has elapsed.

For this reason the control and/or regulation is configured so that, after a violation of a limit value has been recognized, the intervention only occurs once. Subsequently these types of strongly rectified reactions are blocked for the period until the measured value again adheres to the limit value that has been violated. This should be the case at the latest after the dead time and delay time of the combustion apparatus 1 have elapsed. This is not the case when the change in the fuel air ratio and/or the air ratio $\lambda$ is greater than is covered by the factor. After the dead time and delay time of the combustion apparatus 1 have elapsed normal regulation is enabled again in any event.

A blocking of further rectified reactions can also be brought about indirectly. For a known effect of a change of the actuation of the actuator or of the actuators on the supply amount in the corresponding channel the change in the combustion values achieved can be calculated from this. This change of the combustion values is added in the time thereafter to the next measured values of the combustion sensor 18. It is possible that the dead time and/or delay time of the combustion apparatus 1 is known or that it has been established. Thus it is also known when and/or in which form the change In the combustion values is evident in the measurement signal. Correspondingly the amount added is then to be reduced to the measured value. The measured value calculated or corrected in this way is compared as a result with the multiplication or summation obtained or the setpoint value set. Thus only further, additional changes as a regulation deviation are taken into account and corrected in the next sampling steps.

In some embodiments, the setpoint value obtained by multiplication or summation or the value set after the violation of the limit value is also not kept constant. Instead the setpoint value obtained is immediately guided back again to the setpoint regulation value in normal operation according to the dead time and/or delay time of the combustion apparatus. The violation of a limit value by the measurement signal means that the cause of the change of the combustion process is already some time ago. That time corresponds to at least the dead time and/or delay time of the combustion apparatus 1. Therefore it is useful just to take the setpoint regulation value back with the dead time and/or delay time to the setpoint regulation value in normal operation. In this way overreactions are minimized.

Once the uncorrected measurement signal again adheres to the previously violated limit value, the setpoint regulation value can again be set to the setpoint value for normal operation. Since in any event one is below critical combustion values, the regulation difference still remaining can be compensated for with the reaction speed provided in normal operation.

If, in one of the control and/or regulation steps, the case should occur that one actuator cannot fully follow the activation signal, the following strategies are conceivable. The change is distributed to a number of actuators or another distribution is chosen so that each actuator can follow the newly determined activation. If this is not possible or is not desired by the regulation strategy, the change of activation of this actuator must be divided into a number of steps. This dividing up increases the reaction time of the control and/or regulation however.

In some embodiments, the control and/or regulation facility 12 is optimized with the aid of a further processing unit 31. The further processing unit 31 is arranged at a distance from the control and/or regulation facility 12. For example the further processing unit 31 is arranged at least one kilometer, at least two kilometers or at least five kilometers from the control and/or regulation facility 12. The control and/or regulation facility 12 and the further processing unit 31 are coupled to one another with the aid of a bidirectional data link. For example the control and/or regulation facility 12 and the further processing unit 31 can be coupled to one another with the aid of an Internet connection. A corresponding arrangement is illustrated in FIG. 4. Preferably the Internet connection between the control and/or regulation facility 12 and the further processing unit 31 is encrypted, for example with the aid of a Diffie-Hellman key exchange.

The control and/or regulation facility 12 sends signals of the combustion sensor 18 to the further processing unit 31. In some embodiments, the control and/or regulation facility 12 can also send measured values, which are obtained from the signals of the combustion sensor 18, to the further processing unit 31. It is possible for the further processing unit 31 to receive signals of the combustion sensor 18 and/or measured values from the combustion sensor 18 from a number of combustion apparatuses 1. For example the further processing unit 31 can receive signals and/or measured values from at least one hundred, from at least two hundred, or even from at least five hundred such combustion apparatuses.

The further processing unit 31 establishes from the received signals and/or measured values suitable factors for computational change of the fuel air ratio and/or of the air ratio $\lambda$. The further processing unit 31 can for example employ a neural network and/or a fuzzy logic and/or a statistical method for this purpose.

The further processing unit 31 transfers at least one suitable factor to the control and/or regulation facility 12. The control and/or regulation facility 12 receives the at least one suitable factor.

In some embodiments, the further processing unit 31 comprises a microcontroller. The further processing unit 31 ideally comprises a microprocessor. The further processing unit 31 can be a regulation facility. In some embodiments, the regulation facility comprises a microcontroller. The regulation facility ideally comprises a microprocessor. The regulation facility can comprise a proportional and integral regulator. The regulation facility can further comprise a proportional and integral and derivative regulator.

The control and/or regulation facility 12 can employ the factor for determining a setpoint value for a signal of the combustion sensor 18 or for a measured value from the combustion sensor 18. In this case the change in the fuel air ratio and/or the air ratio $\lambda$ is made indirectly via a regulation to a setpoint value corrected by the factor. The control and/or regulation facility 12 can also use the at least one suitable factor as a basis of direct intervention into at least one first actuator 3, 4, 9. This means that the control and/or regulation facility 12, by direct intervention into the at least one first actuator 3, 4, 9, changes a fuel air ratio and/or an air ratio $\lambda$ and/or an oxygen content. That change is made as a function of the at least one suitable factor.

Parts of a control and/or regulation facility 12 incorporating teachings of the present disclosure can be embodied as hardware and/or as a software module. The software module is embodied in this case by a processing unit, if necessary with the addition of container virtualization. There is further the possibility of implementation with the aid of a Cloud computer and/or with the aid of a combination of the aforementioned options. The software might comprise firmware and/or a hardware driver, which is embodied within an operating system and/or a container virtualization and/or an application program.

Various embodiments of the teachings herein may include a computer program product, which contains the feature of this disclosure or which carries out the necessary steps. For realization as software the functions described can be stored as one or more commands on a computer-readable medium. A few examples of computer-readable media include random access memory (RAM) and/or magnetic random access memory (MRAM) and/or read-only memory (ROM) and/or flash memory and/or electronically programmable ROM (EPROM). A few further examples of computer-readable media include electronically programmable and erasable ROM (EEPROM) and/or registers of a processing unit and/or a hard disk and/or an exchangeable memory unit. What is more computer-readable media includes an optical memory and/or any suitable medium to which there is access by a computer or by other IT apparatuses and applications.

In some embodiments, there is a facility (12) for control and/or regulation of a combustion apparatus (1), the control and/or regulation facility (12) comprising a memory, in which in at least a lower and/or at least one upper limit value and at least one factor and/or a correction value are stored, wherein the facility (12) is configured to be connected for communication to at least one first sensor (18) and to at least one first actuator (3, 4, 9) and is configured:
- to receive an input signal from the at least one first sensor (18);
- to process the first input signal to form a first measured value, which specifies a fuel air ratio and/or an air ratio λ and/or an oxygen content;
- to load the at least one lower and/or at least one upper limit value from the memory and to compare the first measured value with the at least one lower and/or at least one upper limit value;
- if the first measured value is less than the at least one lower limit value or greater than the at least one upper limit value:
- to load the at least one factor from the memory and to determine computationally either a correction value as a function of the at least one lower limit value and/or as a function of the at least one upper limit value and as function of the at least one factor and as a function of the first measured value or
- to load the stored correction value from the memory; and
- to create a first output signal as a function of the correction value determined or stored and to send the first output signal to the at least one first actuator (3, 4, 9).

In some embodiments, there is a facility (12) for control and/or regulation of a combustion apparatus (1), the control and/or regulation facility (12) comprising a memory, in which at least one limit value and at least one factor and/or a correction value are stored, wherein the facility (12) is configured to be connected for communication to at least one first sensor (18) and to at least one first actuator (3, 4, 9) and is configured:
- to receive a first input signal from the at least one first sensor (18);
- to process the first input signal to form a first measured value, which specifies a fuel air ratio and/or an air ratio λ and/or an oxygen content;
- to load the at least one limit value from the memory and to compare the first measured value with the at least one limit value;
- if the first measured value is less than the at least one limit value or greater than the at least one limit value:
- either to load the at least one factor from the memory and to determine computationally a correction value as a function of the at least one limit value and as a function of the at least one factor and as a function of the first measured value or
- to load the stored correction value from the memory; and
- to create a first output signal as a function of the determined or stored correction value and to send the first output signal to the at least one first actuator (3, 4, 9).

The control and/or regulation facility (12) has at least read access to the memory. A read-only, but non-writable memory provides protection for the system against manipulations to the control and/or regulation facility (12). A memory with read and write access on the other hand makes possible configuration changes in operation. In some embodiments, the memory of the control and/or regulation facility (12) comprises a non-volatile memory. The memory of the control and/or regulation facility (12) is ideally a non-volatile memory.

In some embodiments, the correction value is a predetermined correction value. In particular the correction value stored in the memory is a predetermined correction value stored in the memory. As a result of the sending of the first output signal to the at least one first actuator (3, 4, 9) the at least one actuator (3, 4, 9) brings about a change to at least one variable in an exhaust gas of the combustion apparatus (1). The at least one variable in the exhaust gas of the combustion apparatus (1) is preferably selected from
a fuel air ratio,
an air ratio λ,
an oxygen content
in the exhaust gas of the combustion apparatus (1).

In some embodiments, the facility (12) is connected for communication to the at least one first actuator (3, 4, 9); and the facility (12) is connected for communication to the at least one first sensor (18).

In some embodiments, the facility (12) is embodied to create the first output signal as an exclusive function of the determined or stored correction value and/or as a function of current output signals.

In some embodiments, the facility (12) is embodied to create the first output signal as an exclusive function of the determined or stored correction value. The creation of the first output signal can also be implemented in the form of an assignment of correction values and/or current output signals stored in the memory of the facility (12) to first output signals.

In some embodiments, the output signal comprises a rotational speed or setting signal. The rotational speed or setting signal is may be sent to the at least one first actuator (3, 4, 9). In one specific form of embodiment the output signal is a rotational speed or setting signal. The rotational speed or setting signal is preferably sent to the at least one first actuator (3, 4, 9).

In some embodiments, the aforementioned facility (12) is a control facility.

A direct control of the at least one first actuator (3, 4, 9) is accompanied by a short reaction time of the combustion apparatus (1) to a changed combustion process.

In some embodiments, the first output signal is a first regulation signal and the facility (12) is embodied to determine the first regulation signal as a function of the determined or stored correction value and as a function of at least on variable selected from: the first input signal, and the first measured value; And to send the first regulation signal to the at least one first actuator (3, 4, 9).

In some embodiments, the aforementioned facility (12) is a regulation facility. A regulation of the combustion apparatus (1) with the aid of the at least one first actuator (3, 4, 9) makes it possible, compared to pure control, to take account of changes during the combustion process.

In some embodiments, the first output signal is a first regulation signal, the facility (12) has knowledge about the effect of a changed actuation of the at least one first actuator (3, 4, 9) on the throughflow of the corresponding supply channel and is configured to determine the first regulation signal as a function of the determined or stored correction value and/or as a function of the current output signals and as a function of at least one variable selected from: the first input signal, and the first measured value while including the knowledge about the effect of a changed activation of the at least one first actuator (3, 4, 9) on the throughflow of the corresponding supply channel; and to send the first regulation signal to the at least one first actuator (3, 4, 9). In this way deviations can be compensated for quickly and in a precision-targeted manner.

In some embodiments, the first output signal is a first regulation signal, the facility (12) comprises a proportional and integral regulator and is configured to determine the first regulation signal as a function of the determined or stored correction value and as a function of at least one variable selected from: the first input signal and the first measured value while employing the proportional and integral regulator; and to send the first regulation signal to the at least one first actuator (3, 4, 9). A proportional and integral regulation of the combustion apparatus (1) with the aid of the at least one first actuator (3, 4, 9) restricts an oscillation of the combustion process.

In some embodiments, the first output signal is a first regulation signal, the facility (12) comprises a proportional and integral and derivative regulator and is configured to determine the first regulation signal as a function of the determined or stored correction value and as a function of at least one variable selected from: the first input signal and the first measured value while employing the proportional and integral and derivative regulator; and to send the first regulation signal to the at least one first actuator (3, 4, 9). A proportional and integral and derivative regulation of the combustion apparatus (1) with the aid of the at least one first actuator (3, 4, 9), compared to a proportional and integral regulation, more clearly restricts an oscillation of the combustion process.

In some embodiments, the first output signal is a first regulation signal, the facility (12) comprises a filter with a finite pulse response and is configured to determine the first regulation signal as a function of the determined or stored correction value and as a function of at least one variable selected from: the first input signal, and the first measured value while employing the filter with a finite pulse response; and to send the first regulation signal to the at least one first actuator (3, 4, 9). A filter with a finite pulse response damps the regulation of the combustion process. In this case it is possible, through suitable choice of the parameters of the filter, to predetermine temporal characteristics when synchronizing the regulation of the combustion process. Moreover parameters of the filter with a finite pulse response can be chosen specifically with regard to the oscillation behavior of one specific combustion apparatus (1) or of a specific type of the same.

In some embodiments, the at least one factor is greater than one and the at least one limit value is at least a lower limit value and the facility (12) is embodied if the first measured value is less than the at least one lower limit value to determine the correction value computationally through augmentation of the first measured value or through augmentation of the at least one lower limit value in accordance with the at least one factor.

In some embodiments, the at least one factor is greater than one and the at least one limit value is at least a lower limit value and the facility (12) is embodied if the first measured value is less than the at least one lower limit value to determine the correction value computationally through multiplication of the first measured value or through multiplication of the at least one lower limit value by the at least one factor.

In some embodiments, by including an augmentation of the first measured value or an augmentation of the at least one lower limit value in accordance with the at least one factor or by including a multiplication of the first measured value or by including a multiplication of the at least one lower limit value by the at least one factor, the at least one limit value is exclusively a lower limit value.

In some embodiments, the at least one factor is greater than one and the at least one limit value is at least an upper limit value and the facility (12) is embodied if the first measured value is greater than the at least one upper limit value to determine the correction value computationally, in that the first measured value or the at least one upper limit value is related to the at least one factor.

In some embodiments, the at least one factor is greater than one and the at least one limit value is at least an upper limit value and the facility (12) is embodied if the first measured value is greater than the at least one upper limit value to determine the correction value computationally, in that the first measured value or the at least one upper limit value is standardized to the at least one factor.

In some embodiments, the at least one factor is greater than one and the at least one limit value is at least an upper limit value and the facility (12) is embodied if the first measured value is greater than the at least one upper limit value to determine the correction value computationally through division of the first measured value or of the at least one upper limit value by the at least one factor. In some embodiments, by including a reference or standardization of the first measured value or of the at least one upper limit value to the at least one factor or by including a division of the first measured value or of the at least one upper limit value by the at least one factor, the at least one limit value is exclusively an upper limit value.

In some embodiments, without including an augmentation of the first measured value or of the at least one lower limit value in accordance with the at least one factor and without including an increase of the first measured value or of the at least one lower limit value by the at least one factor, wherein the at least one factor is greater than zero and the facility (12) is embodied if the first measured value is less than the at least one lower limit value to determine the correction value computationally by increasing the first measured value or by increasing the at least one lower limit value by the at least one factor.

In some embodiments, without including an augmentation of the first measured value or of the at least one lower limit value in accordance with the at least one factor and without including a multiplication of the first measured value or of the at least one lower limit value by the at least one factor, wherein the at least one factor is greater than zero and the facility (12) is embodied if the first measured value is less than the at least one lower limit value to determine the correction value computationally through addition of the at least one factor and of the first measured value or of the at least one lower limit value. In some embodiments, by including an increase in the first measured value or an increase in the at least one lower limit value by the at least one factor or by including an addition of the first measured value and of the at least one factor or by including an addition of the at least one lower limit value and of the at least one factor, the at least one limit value is exclusively a lower limit value.

In some embodiments, without including a reference or standardization of the first measured value or of the at least one upper limit value to the at least one factor and without including a division of the first measured value or of the at least one upper limit value by the at least one factor, wherein the at least one factor is greater than zero and the facility (12) is embodied if the first measured value is greater than the at least one upper limit value to determine the correction value computationally by reduction of the first measured value or by reduction of the at least one upper limit value by the at least one factor.

In some embodiments, without including a reference or standardization of the first measured value or of the at least one upper limit value to the at least one factor and without including a division of the first measured value or of the at least one upper limit value by the at least one factor, wherein the at least one factor is greater than zero and the facility (12) is embodied if the first measured value is greater than the at least one upper limit value to determine the correction value computationally by lowering of the first measured value or by lowering of the at least one upper limit value by the at least one factor.

In some embodiments, without including a reference or standardization of the first measured value or of the at least one upper limit value to the at least one factor and without including a division of the first measured value or of the at least one upper limit value by the at least one factor, wherein the at least one factor is greater than zero and the facility (12) is embodied if the first measured value is greater than the at least one upper limit value to determine the correction value computationally by reduction of the first measured value or by reduction of the at least one upper limit value by the at least one factor.

In some embodiments, without including a reference or standardization of the first measured value or of the at least one upper limit value to the at least one factor and without including a division of the first measured value or of the at least one upper limit value by the at least one factor, wherein the at least one factor is greater than zero and the facility (12) is embodied if the first measured value is greater than the at least one upper limit value to determine the correction value computationally by subtraction of the at least one factor from the first measured value or from at least one upper limit value. By including a diminution or lowering or reduction of the first measured value by the at least one factor or by including a diminution or lowering or reduction of the at least one upper limit value by the at least one factor or by including a subtraction of the at least one factor from the first measured value or a subtraction of the at least one factor from the at least one upper limit value, the at least one limit value is exclusively an upper limit value.

In some embodiments, an assignment of correction values and/or current output signals to first output signals is additionally stored in the memory, wherein the facility (12) is additionally able to be connected for communication to at least one second sensor (20, 22) and to at least one second actuator (4, 3, 9), wherein the at least one first sensor (18) is different from the at least one second sensor (20, 22), wherein the facility (12) is embodied to load the assignment from the memory; using the assignment, to create the first output signal as an exclusive function of the determined or stored correction value and/or the current output signals and to send it to the at least one first actuator (3, 4, 9); to receive a second input signal from the at least one second sensor (20, 22), wherein the second input signal specifies a flow rate; to process the second input signal to form a second measured value; to determine a second regulation signal as a function of the determined or stored correction value and as a function of at least one variable selected from: the second input signal and the second measured value; and to send the second regulation signal to the at least one second actuator (4, 3, 9).

In some embodiments, an assignment of correction values and/or current output signals to first output signals is additionally stored in the memory, wherein the facility (12) is connected for communication to the at least one second actuator (4, 3, 9); and wherein the facility (12) is connected for communication to the at least one second sensor (20, 22). In some embodiments, the at least one first actuator (3, 4, 9) is different from the at least one second actuator (4, 3, 9). In some embodiments, the aforementioned facility (12) is a control and regulation facility.

A combined control and regulation of the combustion apparatus (1) with the aid of the at least one first actuator (3, 4, 9) and with the aid of the at least one second actuator (4, 3, 9) makes possible a rapid intervention into the combustion process and at the same time enables account to be taken of changes during the combustion process.

In some embodiments, an assignment of correction values to first output signals is additionally stored in the memory, wherein the facility (12) is additionally connected for communication to at least one second sensor (20, 22) and to at least one second actuator (4, 3, 9), wherein the at least one first sensor (18) is different from the at least one second sensor (20, 22), wherein the facility (12) is embodied to load the assignment from the memory; using the assignment, to create the first output signal as an exclusive function of the determined or stored correction value and to send it to the at least one first actuator (3, 4, 9); to receive a second input signal from the at least one second sensor (20, 22), wherein the second input signal specifies a flow rate; to process the second input signal to form a second measured value; to determine a second regulation signal as a function of the determined or stored correction value and as a function of at least one variable selected from: the second input signal and the second measured value; and to send the second regulation signal to the at least one second actuator (4, 3, 9).

In some embodiments, while including a second regulation signal, the facility (12) has knowledge about the effect of a changed activation of the at least one second actuator (4, 3, 9) on the throughflow of the corresponding supply channel and is configured to determine the second regulation signal as a function of the determined or stored correction value and/or as a function of the current output signals and as a function of at least one variable selected from: the second input signal and the second measured value by including the knowledge about the effect of a changed activation of the at least one second actuator (4, 3, 9) on the throughflow of the corresponding supply channel; and to send the second regulation signal to the at least one second actuator (4, 3, 9). In this way deviations can be compensated for quickly and in a precision-targeted manner.

By including a second regulation signal, the facility (12) comprises a proportional and integral regulator and is configured to determine the second regulation signal as a function of the determined or stored correction value and as a function of at least one variable selected from: the second input signal and the second measured value by employing the proportional and integral regulator; and to send the second regulation signal to the at least one second actuator (4, 3, 9). A proportional and integral regulation of the combustion apparatus (1) with the aid of the at least one second actuator (4, 3, 9) limits an oscillation of the combustion process.

In some embodiments, by including a second regulation signal, the facility (12) comprises a proportional and integral and derivative regulator and is configured to determine the second regulation signal as a function of the determined or stored correction value and as a function of at least one variable selected from: the second input signal and the second measured value by employing the proportional and integral and derivative regulator; and to send the second regulation signal to the at least one second actuator (4, 3, 9).

A proportional and integral and derivative regulation of the combustion apparatus (1) with the aid of the at least one second actuator (4, 3, 9), compared to a proportional and integral regulation, may more clearly restrict an oscillation of the combustion process. By including a second regulation signal, the facility (12) comprises a filter with a finite pulse response and is configured to determine the second regulation signal as a function of the determined or stored correction value and as a function of at least one variable selected from: the second input signal and the second measured value by employing the filter with a finite pulse response; and to send the second regulation signal to the at least one second actuator (4, 3, 9). A filter with a finite pulse response damps the regulation of the combustion process. In this case it is possible, through suitable choice of the parameters of the filter, to predetermine temporal characteristics when synchronizing the regulation of the combustion process. Moreover parameters of the filter with a finite pulse response can be chosen specifically with regard to the oscillation behavior of one specific combustion apparatus (1) or of a specific type of the same.

In some embodiments, without including a second regulation signal, wherein an assignment of correction values and/or current output signals to first output signals is additionally stored in the memory, wherein the facility (12) is additionally able to be connected for communication to at least one second sensor (20, 22) and to at least one second actuator (4, 3, 9), wherein the at least one first sensor (18) is different from the at least one second sensor (20, 22), wherein the facility (12) is embodied: to load the assignment from the memory; using the assignment, to create the first output signal as an exclusive function of the determined or stored correction value and/or of the current output signals and to send it to the at least one first actuator (3, 4, 9); to create a first setpoint value, which specifies a flow rate, from the correction value and at least one variable selected from the first output signal, the first input signal, and the first measured value; to receive a second input signal from the at least one second sensor (20, 22), wherein the second input signal specifies a flow rate; to process the second input signal to form a second measured value; to determine a third regulation signal as a function of the first setpoint value and as a function of at least one variable selected from: the second input signal, and the second measured value; and to send the third regulation signal to the at least one second actuator (4, 3, 9). In some embodiments, the at least one first actuator (3, 4, 9) is different from the at least one second actuator (4, 3, 9). In some embodiments, the aforementioned facility (12) is a control and regulation facility.

A combined control and regulation of the combustion apparatus (1) with the aid of the at least one first actuator (3, 4, 9) and with the aid of the at least one second actuator (4, 3, 9) makes possible a rapid intervention into the combustion process and at the same time enables account to be taken of changes during the combustion process. In some embodiments, the at least one second sensor (20, 22) comprises a mass flow sensor or a volume flow sensor. Ideally the at least one second sensor (20, 22) is a mass flow sensor or a volume flow sensor.

In some embodiments, without including a second regulation signal, wherein an assignment of correction values to first output signals is additionally stored in the memory, wherein the facility (12) is additionally able to be connected for communication to at least one second sensor (20, 22) and to at least one second actuator (4, 3, 9), wherein the at least one first sensor (18) is different from the at least one second sensor (20, 22), wherein the facility (12) is embodied: to load the assignment from the memory; using the assignment, to create this first output signal as an exclusive function of the determined or stored correction value and to send it to the at least one first actuator (3, 4, 9); to create a first setpoint value, which specifies a flow rate, from the correction value and from at least one variable selected from the first output signal, the first input signal, and the first measured value; to receive a second input signal from the at least one second sensor (20, 22), wherein the second input signal specifies a flow rate; to process the second input signal to form a second measured value; to determine a third regulation signal as a function of the first setpoint value and as a function of at least one variable selected from: the second input signal and the second measured value; and to send the third regulation signal to the at least one second actuator (4, 3, 9).

In some embodiments, by including a third regulation signal, the facility (12) has knowledge about the effect of a changed actuation of the at least one second actuator (4, 3, 9) on the throughflow of the corresponding supply channel and is configured to determine the third regulation signal as a function of the first setpoint values and/or the current output signals and as a function of at least one variable selected from: the second input signal and the second measured value; by including the knowledge about the effect of a changed actuation of the at least one second actuator (4, 3, 9) on the throughflow of the corresponding supply channel; and to send the third regulation signal to the at least one second actuator (4, 3, 9). In this way deviations can be compensated for quickly and in a precision-targeted manner.

In some embodiments, by including a third regulation signal, the facility (12) comprises a proportional and integral regulator and is configured: to determine the third regulation signal as a function of the first setpoint value and as a function of at least one variable selected from: the second input signal and the second measured value by employing the proportional and integral regulator; and to send the third regulation signal to the at least one second actuator (4, 3, 9). A proportional and integral regulation of the combustion apparatus (1) with the aid of the at least one second actuator (4, 3, 9) limits an oscillation of the combustion process.

In some embodiments, by including a third regulation signal, the facility (12) comprises a proportional and integral and derivative regulator and is configured to determine the third regulation signal as a function of the first setpoint value and as a function of at least one variable selected from: the second input signal and the second measured value by employing the proportional and integral and derivative regulator; and to send the third regulation signal to the at least one second actuator (4, 3, 9). A proportional and integral and derivative regulation of the combustion apparatus (1) with the aid of the at least one second actuator (4, 3, 9), compared to a proportional and integral regulation, more clearly restricts an oscillation of the combustion process.

In some embodiments, by including a third regulation signal the facility (12) comprises a filter with finite pulse response and is configured to determine the third regulation signal as a function of the first setpoint value and as a function of at least one variable selected from: the second input signal and the second measured value by employing the filter with finite pulse response; and to send the second regulation signal to the at least one second actuator (4, 3, 9). A filter with finite pulse response damps the regulation of the combustion process. In this case it is possible, through suitable choice of the parameters of the filter, to predetermine temporal characteristics when synchronizing the regulation of the combustion process. Moreover parameters of the filter with a finite pulse response can be chosen specifically with regard to the oscillation behavior of one specific combustion apparatus (1) or of a specific type of the same.

In some embodiments, a first index for a first fuel and a second index for a second fuel are stored in the memory of the facility (12) and the facility (12) is embodied: to determine the at least one factor computationally as a function of the first index and as a function of the second index; and to store the at least one factor in the memory of the facility (12). Establishing the at least one factor from fuel indices makes possible a dynamic adaptation to changed or additional fuels during operation. In some embodiments, the first index is a first Wobbe index for a first fuel, in particular for a first fuel gas. The second index is a second Wobbe index for a second fuel, in particular for a second fuel gas.

In some embodiments, by including a computational determination of the correction values through augmentation or multiplication or referencing or standardization or division, wherein a first index for a first fuel and a second index for a second fuel are stored in the memory of the facility (12) and the facility (12) is embodied: to determine the at least one factor computationally as a quotient of the first index and of the second index; and to store the at least one factor in the memory of the facility (12).

In some embodiments, by including a computational determination of the correction values by diminution or lowering or reduction or subtraction, wherein a first index for a first fuel and a second index for a second fuel are stored in the memory of the facility (12) and the facility (12) is embodied: to determine the at least one factor computationally as the difference between the first index and the second index; and to store the at least one factor in the memory of the facility (12).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio λ and/or an oxygen content; on the basis of the third measured value and/or on the basis of a dead time and/or delay time of the combustion apparatus (1) to create an output value that is different from the determined or stored correction value; and to create a second output signal as a function of the output value and to send the second output signal to the at least one first actuator (3, 4, 9).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio λ and/or an oxygen content; to compare the third measured value with the at least one lower limit value; if the third measured value is greater than the at least one lower limit value: on the basis of the third measured value and/or on the basis of a dead time and/or delay time of the combustion apparatus (1), to create an output value that is different from the determined or stored correction value; and to create a second output signal as a function of the output value and to send the second output signal to the at least one first actuator (3, 4, 9).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio λ and/or an oxygen content; to compare the third measured value with the at least one upper limit value; if the third measured value is less than the at least one upper limit value: on the basis of the third measured value, to create an output value that is different from the determined or stored correction value; and to create a second output signal as a function of the output value and to send the second output signal to the at least one first actuator (3, 4, 9).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio λ and/or an oxygen content; to compare the third measured value with the at least one lower limit value; if the third measured value is greater than the at least one lower limit value increased by a dead band: on the basis of the third measured value, to create an output value that is different from the determined or stored correction value; and to create a second output signal as a function of the output value and to send the second output signal to the at least one first actuator (3, 4, 9).

In some embodiments, the facility (12) is embodied: after the sending of the first output signal to the at least one first actuator (3, 4, 9), to receive a third input signal from the at least one first sensor (18); to process the third input signal to form a third measured value, which specifies a fuel air ratio and/or an air ratio λ and/or an oxygen content; to compare the third measured value with the at least one upper limit value; if the third measured value is less than the at least one upper limit value reduced by a dead band: on the basis of the third measured value, to create an output value that is different from the determined or stored correction value; and to create a second output signal as a function of the output value and to send the second output signal to the at least one first actuator (3, 4, 9).

Because of the known distance between limit value and setpoint regulation value for normal operation, the comparison of the third measured value with the at least one lower limit value increased by a dead band can be converted into a comparison of the third measured value with the setpoint regulation value for normal operation reduced by a dead band. Likewise the comparison of the third measured value with the at least one upper limit value reduced by a dead band can be converted into a comparison of the third measured value with the setpoint regulation value for normal operation increased by a dead band.

In some embodiments, the dead band is a tolerance range. The dead band for augmentation of the limit value or setpoint regulation value for normal operation can be different from the dead band for reduction of the limit value or setpoint regulation value for normal operation.

In some embodiments, the output value corresponds to a normal operation of the combustion apparatus (1). Ideally the output value corresponds to a normal control and/or regulation mode of the combustion apparatus (1). In some embodiments, the output value corresponds to a setpoint regulation value in normal operation of the combustion apparatus (1), which specifies a fuel air ratio and/or an air ratio λ and/or an oxygen content. Preferably the second output signal corresponds to a normal operation of the combustion apparatus (1). Ideally the second output signal corresponds to a normal control and/or regulation mode of the combustion apparatus (1).

The second output signal can also be guided in a number of steps or in a number of samplings with a new third measured value in each case to the final output signal. This means that the second output signal is guided in a number of control and/or regulation cycles corresponding to the dead time and/or delay time of the combustion apparatus (1) to the final output signal. In this case the final output signal corresponds to a normal control and/or regulation mode of the combustion apparatus (1). Through the output value based on a measured value after the regulating out of the change the combustion apparatus (1) and the combustion process can return to normal operation after final regulating out of the change.

In the case of a fault, the output value corresponds to the normal operation of the combustion apparatus (1) before the fault. In that case the output value corresponds to the normal control and/or regulation mode of the combustion apparatus (1) before the fault. In the case of a fault the second output signal corresponds to the normal operation of the combustion apparatus (1) before the fault. In that case the second output signal corresponds to the normal control and regulation mode of the combustion apparatus (1) before the fault.

In the case of a fault the second output signal can also be guided in a number of steps or in a number of samplings with a new third measured value in each case to the output signal before the fault. This means that the second output signal is guided in a number of control and/or regulation cycles, corresponding to a dead time and/or delay time of the combustion apparatus (1) to the output signal before the fault. In this case the output signal before the fault corresponds to a normal control and/or regulation mode of the combustion apparatus (1). Through the output value based on a measured value after the fault the combustion apparatus (1) and the combustion process can return to normal operation after the end of a temporary fault.

In some embodiments, the facility (12) is embodied: after the sending of the first output signal to the at least one first actuator (3, 4, 9), to receive a fourth input signal from the at least one first sensor (18); to process the fourth input signal to form a fourth measured value, which specifies a fuel air ratio and/or an air ratio $\lambda$ and/or an oxygen content; to add to the fourth measured value a change of an input signal of the at least one first sensor (18) to be expected because of previous output signals, taking into account a dead time and/or delay time of the combustion apparatus (1); to create a second setpoint regulation value, which specifies a fuel air ratio and/or an air ratio $\lambda$ and/or an oxygen content, as a function of the determined or stored correction value and as a function of the dead time and/or delay time; and to regulate the combustion apparatus (1) based on the second setpoint regulation value.

In some embodiments, the facility (12) is embodied: after the sending of the first output signal to the at least one first actuator (3, 4, 9), to receive a fourth input signal from the at least one first sensor (18); to process the fourth input signal to form a fourth measured value, which specifies a fuel air ratio and/or an air ratio $\lambda$ and/or an oxygen content; to add to the fourth measured value a change of an input signal of the at least one first sensor (18) to be expected because of previous output signals, taking into account a dead time and/or delay time of the combustion apparatus (1); to create a second setpoint regulation value, which specifies a fuel air ratio and/or an air ratio $\lambda$ and/or an oxygen content, as a result of the correction values, which are guided in accordance with the dead time and/or delay time to the setpoint regulation value in normal operation; and to regulate the combustion apparatus (1) based on the second setpoint regulation value.

In some embodiments, by including a second setpoint regulation value, wherein the facility (12) is embodied to regulate the at least one first actuator (3, 4, 9) based on the second setpoint regulation value. The second setpoint regulation value can also be guided in a number of steps or in a number of samples each with a new fourth input signal to the setpoint regulation value in normal operation. This means that the second setpoint regulation value is guided in a number of cycles, corresponding to the dead time and/or delay time of the combustion apparatus (1), to the setpoint regulation value in normal operation.

In some embodiments, the facility (12) is connected to at least one or to the at least one second sensor (20, 22) for communication and is configured: after the sending of the first output signal to the at least one first actuator (3, 4, 9), to receive a fifth input signal from the at least one second sensor (20, 22), wherein the fifth input signal specifies a flow rate; to process the fifth input signal to form a fifth measured value; to receive a sixth input signal or a multitude of sixth input signals from the at least one first sensor (18); to create a third setpoint regulation value, which specifies a fuel air ratio and/or an air ratio $\lambda$ and/or an oxygen content, as a function of the fifth measured value and as a function of the sixth input signal or of the multitude of sixth input signals and/or as a function of a dead time and/or delay time of the combustion apparatus (1); and to regulate the combustion apparatus (1) based on the third setpoint regulation value.

The present disclosure further teaches one of the aforementioned facilities (12) by including a third setpoint regulation value, wherein the facility (12) is embodied to regulate the at least one first actuator (3, 4, 9) based on the third setpoint regulation value. The third setpoint regulation value can also be guided in a number of steps or in a number of samplings, with a new fifth and sixth input signal in each case, to the setpoint regulation value in normal operation. This means that the third setpoint regulation value is guided in a number of cycles, corresponding to a dead time and/or delay time of the combustion apparatus (1), to the setpoint regulation value in normal operation.

In some embodiments, the facility (12) is connected for communication to the at least one safety shutoff valve (7, 8), wherein the facility (12) is embodied: after the sending of the first output signal to the at least one first actuator (3, 4, 9) and after a dead time and/or delay time of the combustion apparatus (1) has elapsed, to receive a seventh input signal from the at least one first sensor (18); to process the seventh input signal to form a seventh measured value, which specifies a fuel air ratio and/or an air ratio $\lambda$ and/or an oxygen content; to compare the seventh measured value with the at least one lower or the at least one upper limit value; if the seventh measured value is less than the at least one lower limit value or is greater than the at least one upper limit value, to create a closure signal; and to send the closure signal to the at least one safety shutoff valve (7, 8). In some embodiments, the closure signal comprises a command for closure of the at least one safety shutoff valve (7, 8). In some embodiments, the at least one safety shutoff valve (7, 8) is different from the at least one first actuator (3, 4, 9).

In some embodiments, if the seventh measured value is less than the at least one lower limit value or is greater than the at least one upper limit value, to create a locking signal; and to send the locking signal to the at least one safety shutoff valve (7, 8). In some embodiments, the locking signal comprises a command for locking of the at least one safety shutoff valve (7, 8). In some embodiments, the locking signal comprises a command for locking of the combustion apparatus (1).

In some embodiments, there is a combustion apparatus (1) comprising at least one combustion chamber (2), at least one first actuator (3, 4, 9), which acts on a fuel supply or an air supply to at least one combustion chamber (2), and at least one first sensor (18), and one of the aforementioned facilities (12), wherein the facility (12) is connected for communication to at least one first actuator (3, 4, 9); and wherein the facility (12) is connected for communication to the at least one first sensor (18).

In some embodiments, the at least one first sensor (18) comprises an ionization electrode or an oxygen sensor. In some embodiments, the at least one first sensor (18) is an ionization electrode or an oxygen sensor. In some embodiments, the combustion apparatus (1) comprises at least one combustion chamber (2) and the at least one first sensor (18) comprises an ionization electrode and is arranged in the at least one combustion chamber (2). In some embodiments, the combustion apparatus (1) comprises an exhaust gas channel and the at least one first sensor (18) comprises an oxygen sensor and is arranged in the exhaust gas channel.

In some embodiments, there is a combustion apparatus (1) comprising at least one combustion chamber (2), at least one first actuator (3, 4, 9), which acts on a fuel supply or an air supply to the at least one combustion chamber (2), at least one second actuator (4, 3, 9), which acts on the fuel supply or the air supply to at least one combustion chamber (2) and is different from the at least one first actuator (3, 4, 9), at least one first sensor (18), at least one second sensor (20, 22), which is different from the at least one first sensor, and one of the aforementioned facilities (12) by including a second or third regulation signal, wherein the facility (12) is connected for communication to the at least one first actuator (3, 4, 9); wherein the facility (12) is connected for communication to the at least one second actuator (4, 3, 9); wherein the facility (12) is connected for communication to the at least one first sensor (18); and wherein the facility (12) is connected for communication to the at least one second sensor (20, 22).

In some embodiments, the at least one first sensor (18) is different from at least one first actuator (3, 4, 9). The at least one second sensor (20, 22) is different from the at least one second actuator (4, 3, 9). In some embodiments, the at least one second sensor (20, 22) comprises a mass flow sensor or a volume flow sensor. In some embodiments, the at least one second sensor (20, 22) is a mass flow sensor or a volume flow sensor. In some embodiments, the combustion apparatus (1) comprises an air supply channel (11) and the at least one second sensor (20) comprises a mass flow sensor and is arranged in the air supply channel (11). In some embodiments, the combustion apparatus (1) comprises a fuel supply channel and the at least one second sensor (22) comprises a mass flow sensor and is arranged in the fuel supply channel. In some embodiments, the combustion apparatus (1) comprises an air supply channel (11) and the at least one second sensor (20) comprises a volume flow sensor and is arranged in the air supply channel (11). In some embodiments, the combustion apparatus (1) comprises a fuel supply channel and the at least one second sensor (22) comprises a volume flow sensor and is arranged in the fuel supply channel.

What has been stated relates to individual embodiments of the teachings of the present disclosure. Various changes to each embodiment can be undertaken without departing from the fundamental idea and without departing from the framework of this disclosure. The subject matter of the present disclosure is not defined via the specific examples described. A wide variety of changes can be made without departing from the area of protection of the claims set out below.

REFERENCE CHARACTERS

1: Combustion apparatus
2: Combustion chamber
3: Fan with (optionally) variable speed
4: Air flap with setting drive
5: Combustion air
6: Fuel for combustion or fuel supply channel
7: Safety shutoff valve
8: Safety shutoff valve
9: Fuel actuator with setting drive for changing the fuel supply
10: Exhaust gas
11: Air supply channel
12: Control and/or regulation facility
13: Control signal for air flap (setting angle)
14: Activation signal for fan speed (optional)
15: On/off signal for safety shutoff valve
16: On/off signal for safety shutoff valve
17: Control signal for fuel actuator (for example setting angle/step setting/etc.)
18: Sensor for detecting the air ratio λ (oxygen sensor, etc.)
19: Measurement signal for air count sensor for detecting the air ratio
20: Sensor for detecting the air supply (rotational speed sensor/volume flow sensor/mass flow sensor/etc.)
21: Measurement signal from air supply sensor
22: Sensor for detecting the fuel supply (volume flow sensor/mass flow sensor/etc.)
23: Measurement signal from fuel supply sensor
24: Axis for the fuel air ratio and/or air ratio λ and/or oxygen content
25: Axis for emissions
26: Emissions curve, for example carbon monoxide, over fuel air ratio and/or air ratio λ and/or oxygen content
27: Critical emissions/carbon monoxide values threshold
28: Critical fuel air ratio and/or critical air ratio λ and/or critical oxygen content=limit value
29: Fuel air ratio and/or air ratio λ and/or oxygen content: setpoint regulation value after falling below the limit value
30: Fuel air ratio and/or air ratio λ and/or oxygen content: setpoint regulation value in normal operation
31: further processing unit

The invention claimed is:

1. A facility for control of a combustion apparatus, the facility comprising:
   a memory storing a limit value and a correction factor;
   a communication connection to a first sensor and a first actuator; and
   a processor configured to:
     receive a first input signal from the first sensor;
     use the first input signal to form a first measured value specifying a fuel air ratio, an air ratio, and/or an oxygen content;
     load the limit value from the memory and compare the first measured value with the limit value;
     if the first measured value is less than the limit value or is greater than the limit value, either to load the correction factor from the memory and determine a correction value computationally as a function of the limit value and as a function of the correction factor and the first measured value, or to load the stored correction value from the memory; and to create a first output signal as a function of the determined or stored correction value and to send the first output signal to the first actuator;

wherein the factor is greater than one; and the limit value is a lower limit value and the processor is programmed, if the first measured value is less than the at least one lower limit value, to determine the correction value computationally through augmentation of the measured value or through augmentation of the lower limit value in accordance with the factor; or the limit value is an upper limit value and the processor is programmed to, if the first measured value is greater than the at least one upper limit value, to determine the correction value computationally by division of the first measured value or of the at least one upper limit value by the at least one factor.

2. The facility as claimed in claim 1, wherein the processor is programmed to create the first output signal as an exclusive function of the determined or stored correction value and/or as a function of current output signals.

3. The facility as claimed in claim 1, wherein:
the first output signal comprises a regulation signal; and
the processor is programmed to: determine the regulation signal as a function of the determined or stored correction value and at least one variable selected from: the first input signal and the first measured value; and send the regulation signal to the first actuator.

4. The facility as claimed in claim 1, wherein:
the memory further stores an assignment of correction values to first output signals and/or an assignment of current output signals to the first output signals;
the connection provides communication to a second sensor and to a second actuator;
the processor is programmed to:
load the assignment from the memory;
using the assignment, create the first output signal as an exclusive function of the determined or stored correction value and/or of the current output signals and to send it to the first actuator;
receive a second input signal from the second sensor, wherein the second input signal specifies a flow rate;
process the second input signal to form a second measured value;
determine a second regulation signal as a function of the determined or stored correction value and as a function of at least one variable selected from: the second input signal and the second measured value; and
to send the second regulation signal to the at least one second actuator.

5. The facility as claimed in claim 1, wherein:
the memory further stores an assignment of correction values to first output signals and/or an assignment of current output signals to the first output signals;
the connection provides communication to a second sensor and to a second actuator; and
the processor is programmed to:
load the assignment from the memory;
by using the assignment, create the first output signal as an exclusive function of the determined or stored correction value and/or of the current output signals and to send it to the first actuator;

create a first setpoint value specifying a flow rate from the correction value and at least one variable selected from: the first output signal, the first input signal, and the first measured value;
receive a second input signal from the second sensor, wherein the second input signal specifies a flow rate;
process the second input signal to form a second measured value;
determine a third regulation signal as a function of the first setpoint value and at least one variable selected from: the second input signal and the second measured value; and
send the third regulation signal to the second actuator.

6. The facility as claimed in claim 1, wherein:
the memory stores a first index for a first fuel and a second index for a second fuel; and
the processor is programmed to:
determine the correction factor computationally as a function of the first index and the second index; and
store the factor in the memory.

7. The facility as claimed in claim 1, wherein the processor is programmed to:
after sending of the first output signal to the first actuator, to receive a third input signal from the first sensor;
process the third input signal to form a third measured value, which specifies a fuel air ratio and/or an air ratio $\lambda$ and/or an oxygen content;
compare the third measured value with the lower limit value;
if the third measured value is greater than the lower limit value, on the basis of the third measured value and/or on the basis of a dead time and/or delay time of the combustion apparatus, to create an output value different from the determined or stored correction value; and
create a second output signal as a function of the output value and to send the second output signal to the first actuator.

8. The facility as claimed in claim 1, wherein the processor is programmed to:
after sending the first output signal to the first actuator, receive a fourth input signal from the first sensor;
process the fourth input signal to form a fourth measured value specifying a fuel air ratio and/or an air ratio $\lambda$ and/or an oxygen content;
add to the fourth measured value a change to be expected of an input signal of the first sensor because of previous output signals, while taking into account a dead time and/or delay time of the combustion apparatus;
create a second setpoint regulation value specifying a fuel air ratio and/or an air ratio $\lambda$ and/or an oxygen content, as a function of the determined or stored correction value and as a function of the dead time and/or delay time; and
regulate the combustion apparatus based on the second setpoint regulation value.

9. The facility as claimed in claim 1, wherein the connection provides communication to a second sensor; and
the processor is programmed to:
after sending the first output signal to the first actuator, receive a fifth input signal from the second sensor, wherein the fifth input signal specifies a flow rate;
process the fifth input signal to form a fifth measured value;
receive a sixth input signal from the first sensor;
create a third setpoint regulation value specifying a fuel air ratio and/or an air ratio $\lambda$ and/or an oxygen content, as a function of the fifth measured value and the sixth input signal and/or as a function of a dead time and/or delay time of the combustion apparatus; and to regulate the combustion apparatus based on the third setpoint regulation value.

10. The facility as claimed in claim 1, wherein:

the connection provides communication to a safety shut-off valve; and the processor is programmed to:

after sending the first output signal to the first actuator and after a dead time and/or delay time of the combustion apparatus has elapsed, receive a seventh input signal from the first sensor;

process the seventh input signal to form a seventh measured value specifying a fuel air ratio and/or an air ratio λ and/or an oxygen content;

compare the seventh measured value with the limit value;

if the seventh measured value is less than the lower limit value or greater than the upper limit value, to create a closure signal and send the closure signal to the safety shutoff valve.

11. A facility for control of a combustion apparatus, the facility comprising:

a memory storing a limit value and a correction factor;

a communication connection to a first sensor and a first actuator; and a processor configured to:

receive a first input signal from the first sensor;

use the first input signal to form a first measured value specifying a fuel air ratio, an air ratio, and/or an oxygen content;

load the limit value from the memory and compare the first measured value with the limit value;

if the first measured value is less than the limit value or is greater than the limit value, either to load the correction factor from the memory and determine a correction value computationally as a function of the limit value and as a function of the correction factor and the first measured value, or to load the stored correction value from the memory; and to create a first output signal as a function of the determined or stored correction value and to send the first output signal to the first actuator;

wherein the factor is greater than zero; and the limit value is a lower limit value and the processor is programmed, if the first measured value is less than the lower limit value, to determine the correction value computationally by increasing the first measured value or by increasing the lower limit value by the factor; or the limit value is an upper limit value and the processor is programmed, if the first measured value is greater than the upper limit value, to determine the correction value computationally by reduction of the first measured value or by reduction of the upper limit value by the factor.

12. The facility as claimed in claim 11, wherein:

the memory further stores an assignment of correction values to first output signals and/or an assignment of current output signals to the first output signals;

the connection provides communication to a second sensor and to a second actuator;

the processor is programmed to:

load the assignment from the memory;

using the assignment, create the first output signal as an exclusive function of the determined or stored correction value and/or of the current output signals and to send it to the first actuator;

receive a second input signal from the second sensor, wherein the second input signal specifies a flow rate;

process the second input signal to form a second measured value;

determine a second regulation signal as a function of the determined or stored correction value and as a function of at least one variable selected from: the second input signal and the second measured value; and to send the second regulation signal to the at least one second actuator.

13. The facility as claimed in claim 11, wherein:

the memory further stores an assignment of correction values to first output signals and/or an assignment of current output signals to the first output signals;

the connection provides communication to a second sensor and to a second actuator; and the processor is programmed to:

load the assignment from the memory;

by using the assignment, create the first output signal as an exclusive function of the determined or stored correction value and/or of the current output signals and to send it to the first actuator;

create a first setpoint value specifying a flow rate from the correction value and at least one variable selected from: the first output signal, the first input signal, and the first measured value;

receive a second input signal from the second sensor, wherein the second input signal specifies a flow rate;

process the second input signal to form a second measured value;

determine a third regulation signal as a function of the first setpoint value and at least one variable selected from: the second input signal and the second measured value; and send the third regulation signal to the second actuator.

14. The facility as claimed in claim 11, wherein:

the memory stores a first index for a first fuel and a second index for a second fuel; and the processor is programmed to:

determine the correction factor computationally as a function of the first index and the second index; and store the factor in the memory.

15. The facility as claimed in claim 11, wherein the processor is programmed to:

after sending of the first output signal to the first actuator, to receive a third input signal from the first sensor;

process the third input signal to form a third measured value, which specifies a fuel air ratio and/or an air ratio λ and/or an oxygen content;

compare the third measured value with the lower limit value;

if the third measured value is greater than the lower limit value, on the basis of the third measured value and/or on the basis of a dead time and/or delay time of the combustion apparatus, to create an output value different from the determined or stored correction value; and create a second output signal as a function of the output value and to send the second output signal to the first actuator.

16. The facility as claimed in claim 11, wherein the processor is programmed to:

after sending the first output signal to the first actuator, receive a fourth input signal from the first sensor;

process the fourth input signal to form a fourth measured value specifying a fuel air ratio and/or an air ratio λ and/or an oxygen content;

add to the fourth measured value a change to be expected of an input signal of the first sensor because of previous output signals, while taking into account a dead time and/or delay time of the combustion apparatus;

create a second setpoint regulation value specifying a fuel air ratio and/or an air ratio λ and/or an oxygen content, as a function of the determined or stored correction value and as a function of the dead time and/or delay time; and regulate the combustion apparatus based on the second setpoint regulation value.

17. The facility as claimed in claim 11, wherein the connection provides communication to a second sensor; and the processor is programmed to:

after sending the first output signal to the first actuator, receive a fifth input signal from the second sensor, wherein the fifth input signal specifies a flow rate;

process the fifth input signal to form a fifth measured value;

receive a sixth input signal from the first sensor;

create a third setpoint regulation value specifying a fuel air ratio and/or an air ratio λ and/or an oxygen content, as a function of the fifth measured value and the sixth input signal and/or as a function of a dead time and/or delay time of the combustion apparatus; and to regulate the combustion apparatus based on the third setpoint regulation value.

18. The facility as claimed in claim 11, wherein:

the connection provides communication to a safety shut-off valve; and the processor is programmed to:

after sending the first output signal to the first actuator and after a dead time and/or delay time of the combustion apparatus has elapsed, receive a seventh input signal from the first sensor;

process the seventh input signal to form a seventh measured value specifying a fuel air ratio and/or an air ratio λ and/or an oxygen content;

compare the seventh measured value with the limit value;

if the seventh measured value is less than the lower limit value or greater than the upper limit value, to create a closure signal and send the closure signal to the safety shutoff valve.

* * * * *